US008700620B1

(12) United States Patent  (10) Patent No.: US 8,700,620 B1
Lieberman  (45) Date of Patent: Apr. 15, 2014

(54) ARTIFICIAL INTELLIGENCE METHOD AND APPARATUS

(76) Inventor: Jeremy Lieberman, New York, NY (US)

(*) Notice: Subject to any disclaimer, the term of this patent is extended or adjusted under 35 U.S.C. 154(b) by 0 days.

(21) Appl. No.: 13/094,793

(22) Filed: Apr. 26, 2011

Related U.S. Application Data

(60) Provisional application No. 61/328,473, filed on Apr. 27, 2010.

(51) Int. Cl.
*G06F 7/00* (2006.01)
*G06F 17/30* (2006.01)

(52) U.S. Cl.
USPC ........................................................ 707/728

(58) Field of Classification Search
USPC .................................. 707/706, 999.005, 728
See application file for complete search history.

(56) References Cited

U.S. PATENT DOCUMENTS

| 8,064,736 | B2* | 11/2011 | Chan et al. | 382/305 |
| 8,126,832 | B2* | 2/2012 | Spring | 706/46 |
| 8,214,366 | B2* | 7/2012 | Gorman et al. | 707/738 |
| 2007/0185860 | A1* | 8/2007 | Lissack | 707/5 |
| 2011/0137882 | A1* | 6/2011 | Weerasinghe | 707/707 |
| 2012/0023104 | A1* | 1/2012 | Johnson et al. | 707/740 |

OTHER PUBLICATIONS

Andreasan et al, "On ontology-based querying", 2000, Flexible Query Answering Systems, Recent Advances, Physica-Verlag, Springer, pp. 15-26.*
Abdelhamid et al, "Enhancing Search Results of Concept Annotated Documents", 2009, IEEE IRI 2009, pp. 330-335.*
George A. Miller, "WordNet: A Lexical Database for English", 1995, Communications of the ACM, vol. 38, No. 11.*
Moldovan et al, "Using WordNet and Lexical Operators to Improve Internet Searches", 2000.*
Segalovich, "A fast morphological algorithm with unknown word guessing induced by a dictionary for a web search engine", 2003.*
Fellbaum, Christiane. 2007. Wordnets: Design, Contents, Limitations. http://dydan.rutgers.edu/Workshops/Semantics/slides/fellbaum.pdf.

* cited by examiner

*Primary Examiner* — Brannon W Smith
(74) *Attorney, Agent, or Firm* — Handal & Morofsky LLC

(57) ABSTRACT

The invention entails a method of Etiological prioritization based on an original symbolic model of the causative construction of singular logical relations which are built from an initiation of sensed masses in patterns, the naming of sensed patterns into words, the description of the relations of masses using specific English language primitives, the relations between masses and words, and the relations between primitive words. This process is built upon a theory and model of discretized human capabilities and learned experiential meanings. Human capabilities and learned experiential meanings are identified as singular primitives and amount to words identified and matched to singular parts that make up human capabilities and the inventive model of the experiences of the sensing and understanding of the spatiotemporal physical world.

21 Claims, 18 Drawing Sheets

Unit Conversion Procedure

Convert $\dfrac{\text{miles}}{\text{hour}}$ into $\dfrac{\text{feet}}{\text{minute}}$ $r \dfrac{\text{miles}}{\text{hour}} \times \dfrac{1 \text{ hour}}{60 \text{ minutes}} \times \dfrac{5280 \text{ feet}}{1 \text{ mile}}$ Note: This is not the motion formula

Multiplying Fractions Cell

Any time we multiply fractions in which the numerator and denominator are the same, they cancel each other out.

for example: $\dfrac{2}{\cancel{5}} \times \dfrac{\cancel{5}}{7} = \dfrac{2}{7}$ In addition, if we multiply fractions having the same units of time such as (hours/minutes), they also cancel each other out.

Note: the number of hours or minutes left in place can be multiplied

Problem #1

Calculate your vertical speed in feet per minute. To calculate the time you will need to rise to 12,000 ft at your current angle of ascent of 6°, you will first need to convert your vertical speed, 115 mph, into feet per minute

FIGURE 10

ARTIFICIAL INTELLIGENCE METHOD AND APPARATUS

CROSS REFERENCE TO RELATED APPLICATIONS

This application claims the benefit of Provisional Patent Application No. 61/328,473, filed Apr. 27, 2010, and entitled SYSTEM AND METHODS FOR CONTEXT AND CONCEPT BASED KNOWLEDGE ENCODING, the disclosure and appendices of which are hereby incorporated herein by reference thereto.

TECHNICAL FIELD

The invention relates to artificial intelligence methods and apparatus implementing such methods, which are particularly useful for the automated search of large amounts of textual information such as that available over the Internet.

STATEMENT REGARDING FEDERALLY SPONSORED RESEARCH OR DEVELOPMENT (Not applicable)

BACKGROUND OF THE INVENTION

Today, the gathering of information using publicly available sources, such as those available over the Internet, is of principal importance in the performance of everyday tasks. In addition, similar activities involving the identification of desired information resident in nonpublic sources, such as LEXIS-NEXIS, private corporate libraries, consulting firm databases, law firm document databases and so forth are at the center of many educational, commercial and other tasks.

Much effort has been devoted to search engines with the objective of enabling the identification and retrieval of content relevant to user-specified topics of breadth ranging from the very specific to the relatively broad.

Typically, text searching on the Web is done by keyword searching. These keywords may be user input and specified in connection with a Boolean algorithm, or they may be extracted by the search engine. After this has been done, the search engine can do a text query and retrieval using keywords. Generally, the search engine looks for keywords and tries to find documents containing the keywords. However, in addition to searching for words, various algorithms are used to implement such items as what is referred to as "ranking," "relevancy," and so forth. The occurrence of keywords in a document among a collection of documents being searched can be used as an indication of the content of a document.

However, the mere appearance of one or more keywords in a document does not necessarily indicate that the document is relevant to the inquiry. For this reason, search engines typically give way to document publisher indications of keywords, for example metatags. Because search engines operate according to algorithms, and are not rational human beings, they do not deal with meaning. In an attempt to overcome this, particularly weight may be given to parts of a document. For example, headings, or the title of a document may be given more weight. Likewise, words which appear near the beginning of a document may also be given more weight by a search engine. Repetition of the same keywords may also result in additional weight being given to the document.

The shortcomings of such a system are apparent. Accordingly, even "full-text" indexing systems generally do not process commonly occurring stop words such as "a," "an," "the," "is," "but," "and," "or," and "www." Search engines may also differentiate between capitalized and lower case words in an attempt to infer meaning.

Still another problem is when keywords are relatively common, resulting in the retrieval of large numbers of documents. Likewise, if every keyword has multiple meanings, much of the search results may be of little or no value.

Another expedient is so-called Page ranking, under which the link to a particular document improves its rank. If there are many links, or if the links are from recognized quality sites, the links add still more weight. Effectively, links are endorsements that attest to importance, reliability, popularity, or the like, all of which would suggest a higher likelihood that the linked document would be relevant to the inquiry.

At the other side of the process, organizations wishing to drive traffic to their website can take advantage of the limited nature of the search algorithms to use the engine to increase the rank of the website.

SUMMARY OF THE INVENTION

The invention entails a method of Etiological prioritization based on an original symbolic model of the causative construction of singular logical relations which are built from an initiation of sensed masses in patterns, the naming of sensed patterns into words, the description of the relations of masses using specific English language primitives, the relations between masses and words, and the relations between primitive words. This process is built upon a theory and model of discretized human capabilities and learned experiential meanings.

Human capabilities and learned experiential meanings are identified as singular primitives and amount to words identified and matched to singular parts that make up human capabilities and the inventive model of the experiences of the sensing and understanding of the spatiotemporal physical world. Continued etiological development of the inventive model entails new primitive meanings being built via the combination of the inventive model of the primitives of human capabilities with the inventive model of the primitives not representing human capabilities. The method of etiological prioritization is used to create the inventive model of the definitions of many hundreds of English language words and is applied to the explication of specialized domains of knowledge. In accordance with the invention, the method may comprise identifying a plurality of primitive words in a first group, where the primitive words in the first group have a singular meaning. The plurality of primitive words in the first group having a singular meaning are stored at a first set of storage locations in a computing device. A plurality of primitive words in a second group are identified. The plurality of primitive words in the second group have associated meanings which may be defined by the primitive words in the first group and/or other primitive words in the second group. The plurality of primitive words in the second group are stored at a second set of storage locations in a computing device. For each of the primitive words in the second group, its respective associated meanings are stored as definitional linking information, linking a respective primitive word to respective defining primitive words in the first group and/or other primitive words in the second group, whereby upon the identification of any word, a definition comprising linked primitive words may be retrieved. For each of a plurality of definable words, wherein the definable words are selected from the first and second groups, one selects words from the first and second groups as relative words having substantially the same meaning as its respective definable word, and/or associates words in the first and second groups into respective relative phrases having substantially the same meaning as its respective definable word, each of the definable words, together with its respective relative words and relative phrases forming a relative set. For each of the definable words, relative set linking information linking each of the definable words to its respective relative words and relative phrases is stored, whereby upon the identification of any word, the other members of a relative set may be retrieved.

The inventive method of etiological logical progression of primitives necessitates that meanings are progressively built in the inventive model of causation, whereby basic singular forms, starting from sense of mass, are built, which we call sense mass relations. The relationships amongst these sensed masses are used to both build and assign meaning to the inventive primitives and form an ordered hierarchy of inter-relationships. Word primitives are combined with masses and other mass or word primitives to build the meanings of new primitives. The continued development of relationships between primitives and masses assign meaning to and/or build meanings of human based capabilities and experiences, such as recognition, generation, action, want, belief, feelings. As the ontology continues to develop, new meanings are built via the combination of singular primitives representing human capabilities, such as senses, recognitions, feelings, belief, generations, combined with primitives not representing human capabilities, such as masses, operators, prepositions, adjectives, pronouns, interjections, verbs, nouns, and probability.

It would be advantageous to be able to search meaning more effectively. It is an object of the invention to achieve the effective searching of the content of a large number of documents and return limited numbers of relevant documents. The invention constitutes a query parsing engine for development of keywords, and a document parsing engine which has as its object increasing the likelihood of the selection of the most relevant documents when used to analyze documents produced by search engines which operate employing other, for example keyword, methodologies.

Thus the present invention may be understood as acting as a second layer of searching. However, the subject inventive methodology may be employed as a primary or sole method of searching, with or without modifications of the algorithms discussed herein.

In accordance with the invention, the method may comprise identifying a plurality of primitive words in a first group, where the primitive words in the first group have a singular meaning. The plurality of primitive words in the first group having a singular meaning are stored at a first set of storage locations in a computing device. A plurality of primitive words in a second group are identified. The plurality of primitive words in the second group have associated meanings which may be defined by the primitive words in the first group and/or other primitive words in the second group. The plurality of primitive words in the second group are stored at a second set of storage locations in a computing device. For each of the primitive words in the second group, its respective associated meanings are stored as definitional linking information, linking a respective primitive word to respective defining primitive words in the first group and/or other primitive words in the second group, whereby upon the identification of any word, a definition comprising linked primitive words may be retrieved. For each of a plurality of definable words, wherein the definable words are selected from the first and second groups, one selects words from the first and second groups as relative words having substantially the same meaning as its respective definable word, and/or associates words in the first and second groups into respective relative phrases having substantially the same meaning as its respective definable word, each of the definable words, together with its respective relative words and relative phrases forming a relative set. For each of the definable words, relative set linking information linking each of the definable words to its respective relative words and relative phrases is stored, whereby upon the identification of any word, the other members of a relative set may be retrieved.

The inventive method of etiological logical progression of primitives necessitates that meanings are progressively built in the inventive model of causation, whereby basic singular forms, starting from sense of mass, are built, which we call sense mass relations. The relationships amongst these sensed masses are used to both build and assign meaning to the inventive primitives and form an ordered hierarchy of inter-relationships. Word primitives are combined with masses and other mass or word primitives to build the meanings of new primitives. The continued development of relationships between primitives and masses assign meaning to and/or build meanings of human based capabilities and experiences, such as recognition, generation, action, want, belief, and feelings.

The inventive etiological building of successive words based on human capability and experience of the physical world and the emotions and feelings of other people, and other human emotional and perceptual recognitions and generations differs from the approach of a dictionary or thesaurus which select definitional terms bases on different principles.

As the ontology continues to develop, new meanings are built via the combination of singular primitives representing human capabilities, such as senses, recognitions, feelings, belief, generations, combined with primitives not representing human capabilities, such as masses, operators, prepositions, adjectives, pronouns, interjections, verbs, nouns, and probability.

The inventive method may further comprise receiving a query and comparing the words in the query to the words in the first and second groups to determine those words which are not included within the first and second groups. The words in the query found in the first and second groups would form a meaning search. The words of the meaning search set are input into a search engine, the search engine accessing a database of documents. It is then determined whether the words in the meaning search set are in each of the documents. The occurrences in the documents of words in the meaning search set tallying in a search results database. The documents are ranked based upon the occurrences tallied in the search results database to select a plurality of top-ranked documents. The top-ranked documents are then identified.

The words of the query which are not included within the first and second groups may define a keyword set. The keyword set may be input into the search engine. It is then determined whether the words in the keyword set are in each of the documents. The search results database occurrences in the documents of the words in the keyword set may be tallied, and the ranking of the documents also based upon the occurrences of the words in the keyword set tallied in the search results database.

The keyword searching may be done by an enterprise search engine or a search engine accessing a public network such as the Internet.

The second group is divided into a combinatorial group and a terminal group, the combinatorial group comprising words having multiple meanings, and the terminal group comprising words having singular meetings.

In accordance with the invention, one may input into a search engine a group of words and phrases, comprising the words in the meaning search set, the words in the definitions of the words in the meaning search set, and the relative sets of the words in the meaning search set, and the relative sets of the words in the definitions of the words in the meaning search. The determining baby is done on a paragraph by paragraph basis, and the ranking done by ranking individual paragraphs, and then assigning document ranks on the basis of their constituent paragraph rankings.

The top-ranked documents may be identified by outputting top ranked paragraphs and hyperlinking to their respective documents.

In accordance with the invention, the primitive words in the first group may be generated by a method comprising postulating a sensing of mass; recognizing the sensed mass; requiring a word to represent a mass, requiring a word to represent a word, and using a combination of masses and words to make more definitionally complex words.

BRIEF DESCRIPTION THE DRAWINGS

The operation of the invention will become apparent from the following description taken in conjunction with the drawings, in which:

FIG. 10-11 illustrates an application of the invention to a algebraic problem;

DETAILED DESCRIPTION OF THE PREFERRED EMBODIMENTS

Figure 1:
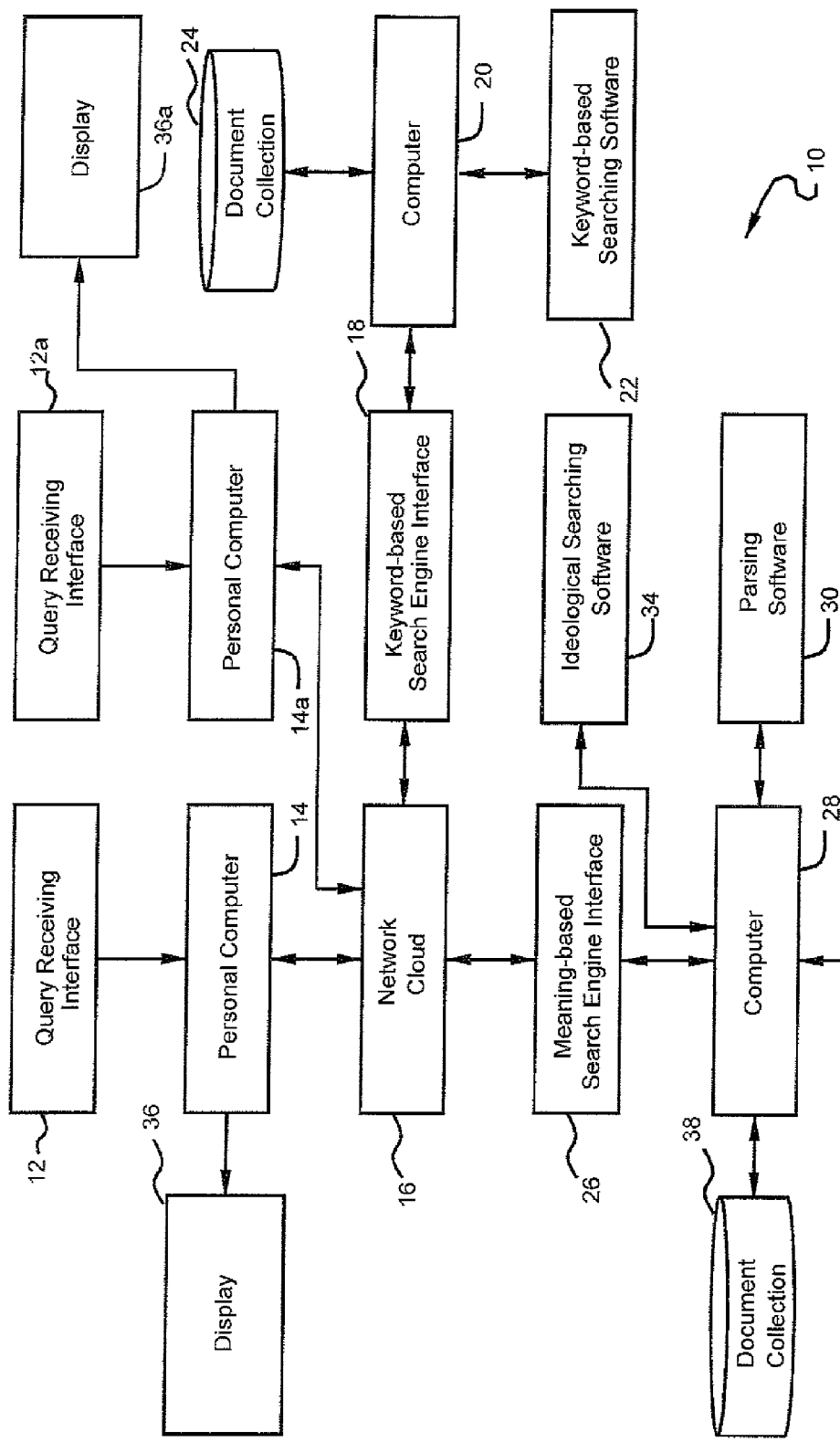
FIG. 1 is a block diagram illustrating a general implementation of the present invention in the context of a meaning search being performed with a keyword search.

The present invention is directed towards systems and methods for encoding knowledge based on primitive domain elements. In general, a human can be cognizant of another human or object, but an object cannot be cognizant of another object unless it is programmed by a human to sense another object. Due to this phenomenon, the present invention continues by stating that the World cannot be described unless you use terms for discretized human capacities (e.g., sensing, touching, feeling, and emotion). The main factor is requirement/need, such that preceding concepts are required to explain new concepts in order to be true within the confines of those known domains.

The present invention uses singular and/or multiple senses of relations to facilitate need/requirement based learning, where a relation is defined as a particular combination of any two or more discrete senses of mass as represented in the inventive system with natural languages words such, as motion, time, space, amount, and depth (all primitives). For example, in one embodiment, before one can learn the concept of "not", one must first understand the concept of "with/adjoinment". Then, the concept of "movement" may be derived using the concepts of "with" and "not". They combinatorial buildups are multi-step relationships (i.e. one primitive in relation to other primitives); however, they are directional and must occur in a specific directional order of a progression in the inventive model of human capabilities. According to the inventive model, a mind must think about itself going forward and getting to X-place before one can gain the capability and therefore gain the understanding of how to go backwards (example of the present invention's formulation of human capability).

In one embodiment, the concept of gain is needed/required for a human or a machine to develop the capacity to understand loss. It is a theory of necessity of encoding human capabilities in the order required (individually and combinatorially) for the sense, memorization and generation of language, its, symbols, words, meanings of words, and the meaning of known phenomena. Particular ordered combinations of concepts within the present invention's hierarchy are required in order for the development of new discretized units of meanings, including concepts/meanings, procedures, and domains to be true. As per the method and system, the existence of these preceding concepts in the hierarchy are necessary for the formation of any additional concepts and domains. At any juncture, we propose that a statement would be false, within the inventive model, if it did not follow the rules, procedures, and definitions of known domains in the hierarchically prioritized order perceived by the aforementioned "human capabilities".

The present invention allows for the analysis, encoding, and need/requirement based hierarchical ordering of particular domains of human knowledge at a level of human capability atomicity (Singular units of meaning) and domain specific meaning units (Statement level definition of meaning units) that is not present in other ontological approaches. Each definition, throughout the domains covered herein, represents the decomposition of concepts/meanings, procedures, and rules into elementary components, represented as meaning units, in a way that cannot meaningfully be decomposed further.

Generally the inventive method builds from basic first possible perceptions which cause sensing of an object and memory, and then lead to a progression of related words that relate to an escalating set of possible descriptions of those masses. Further development of the ontology proceeds on the basis of building first simpler then more complex new terms based on old terms.

The system of the present invention provides a database containing an ontology of concepts and meanings broken into and made of primitive constituents. The concepts and meanings are represented through a succession of statements stored in the database, each of which builds onto the last an additional basic meaning associated with the concepts. In use, when presented with a question or statement from a human, the system parses the question or statement, iterates through the database to identify the primitive constituents used and their associated meanings, and identifies responsive data to present to the human user, which may be an answer, question, or comment. From the human user's perspective the response appears to be the type of response a human knowledgeable in the subject matter of the question would have provided.

In one embodiment, the ontology is built from a plurality of semantic primitives. A semantic primitive comprises the most basic meaning of a given discipline. For example, within a chemistry discipline, one semantic primitive may be "mass". In the inventive system, the number of base semantic primitives for a given discipline would be minimal. From these semantic primitives, the database is configured to construct higher level concepts using a combination of semantic primitives. Furthermore, the database may also build even higher level concepts based on combinations of semantic primitives and domain specific primitives.

The system further comprises a parsing engine operative to receive data from an external source, query the ontology database and categorize the received data based on its categorization within the database ontology. In one embodiment, the database ontology comprises a set of ontology hierarchies and a set of context-dependent definitions of concepts. For particular domains, the database ontology may comprise a single ontological hierarchy. In other domains, the database ontology may comprise a plurality of possibly overlapping ontologies.

In one embodiment, concepts are expressed more using a restricted but not mathematically formalized subset of English. In alternative embodiments, the restricted English grammar used in the inventive definitions may be formalized so that the definitions are fully mathematical in nature and can be processed using automated tools. Each context-dependent definition represents the decomposition and etiological process of a concept's meaning into elementary components, in a way that cannot meaningfully be decomposed further. This decomposition process also reveals the interconnectedness between meanings, which is not observable using standard definitional methodologies found in the prior art. Transformations between one context-dependent meaning and another then become explicit, providing insight into the subject matter being encoded, via statements that have never before been provided at such a granular level in reference materials and prior art.

Figure 11:
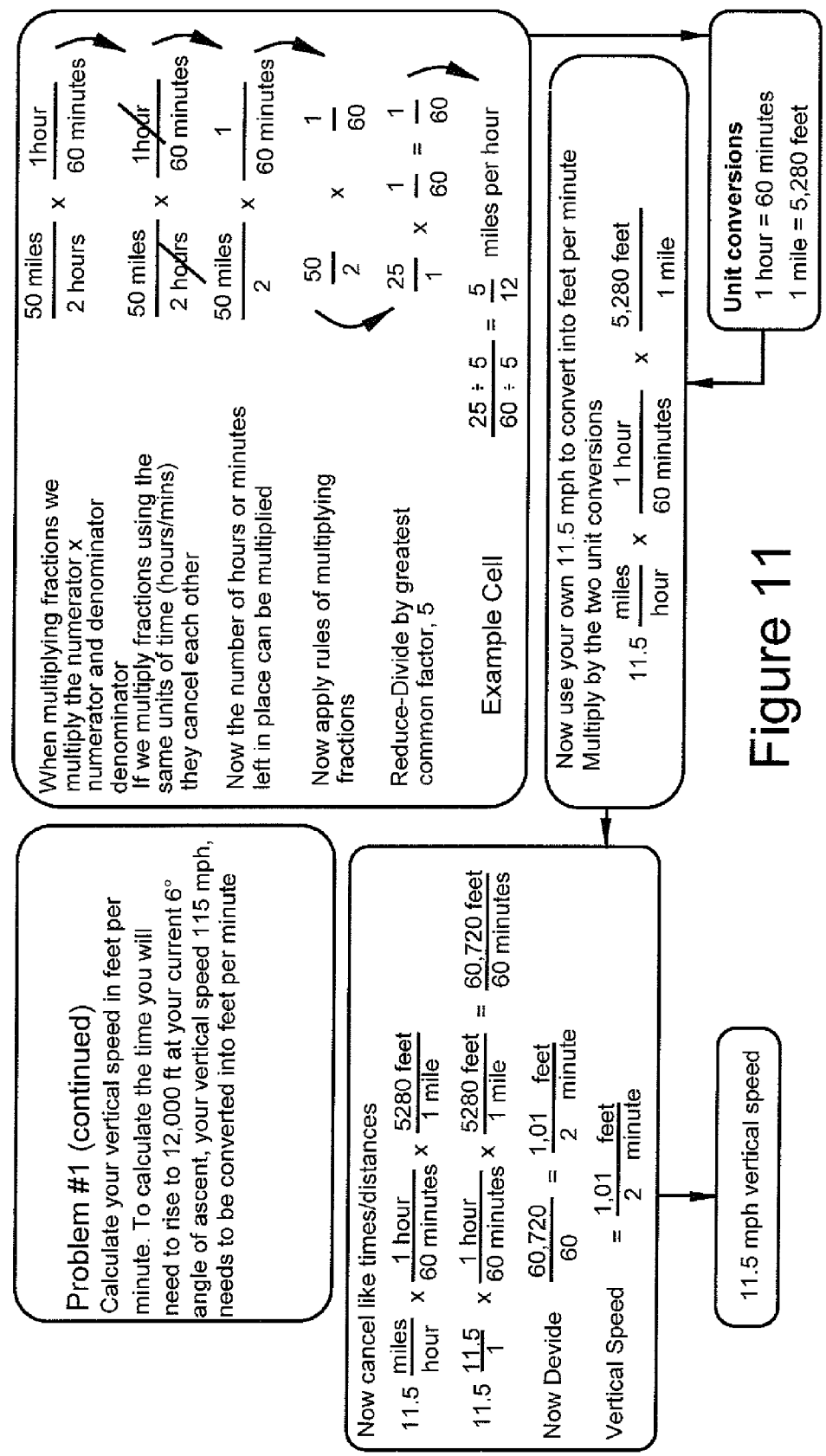

In one embodiment, the system may be configured to receive input comprising textual or domain-specific data. For example, in an algebraic domain, the system may receive input comprising a linguistic string (e.g., sentences formulating an algebraic problem). Alternatively, in an algebraic domain, the system may also receive formulaic inputs such as equations or the like. In connection with this reference is made to FIGS. 10-11.

Upon receiving a linguistic string, the parsing engine is operative to compare the received data against the ontological database. In one embodiment, the ontological database stores language fragments organized according to a predefined hierarchy, as previously discussed. The primary aim of the parsing engine is to determine a class in which the linguistic string may be placed. For example, in an algebraic system, the parsing engine may be in communication with a fragment database storing fragments of known algebra patterns. By communicating with such a database, the system is operative to narrow down the class of problem received by matching the string with known strings.

After determining the class of a given string, the parser is further operative to heuristically analyze the received string to generate a formulaic representation of the string using known formulaic constructs. For example, in the algebraic domain, the parser may be operative to convert a word problem into a series of equations that represent the linguistic problem presented. In such an embodiment, the domain of English can be used in conjunction with the domain of math to convert English language statements into their mathematical equivalents. Alternatively, just the English language statements that pertain to mathematics can be used. In order to fully explicate a subject you to find all of the subdomains that apply to the subject matter as well as all of the primitives of those subdomains. These primitives then need to be defined and hierarchically prioritized in such a way that all primitives, procedures, and properties of the domain are fully explicated as shown in the diagram below. Each step is explicated in such a way that it cannot be further decomposed, and in such way that every required step needed for solving the problem is made into a set of singular logical relations.

An additional application of the inventive system may be one in which the system then queries a database containing domain-specific simulations. The goal of identifying a matching simulation for the deconstructed problem outlined above is to map the variables determined for a given input to a known simulation or scenario stored within the database. For example, an input containing a quadratic equation may map directly onto a simulation involving a trajectory calculation or similar simulation.

Finally, after identifying the appropriate simulation for a given aspect of a received input, the system queries the explicated pathway (every step is fully broken down as to how to understand how to solve each step of the problem) from the input problem to the computed solution and attempts to generate a linguistic solution to the problem that will ultimately be presented to the user. In one embodiment, the system contains a database with linguistic representations of domain-specific transformations.

Finally, after all transformations have been translated into linguistic representations, the system displays the steps utilized to compute the solution to the user. In one embodiment, the system may present the linguistic steps used next to the domain-specific concepts (e.g., mathematical equations). In this embodiment, the system allows a user to view the synthesized mental process of solving the equation as it applies to this particular context, while describing the solution with its simplest possible components (one etiological logical relation at a time), thus allowing the comprehension of increasingly complex questions with readily understandable steps.

The present invention further provides a method for providing solutions for a given input, the solution being based on a database ontology and relationships between concepts present within the ontology.

According to one embodiment, the method selects a discipline. The selected discipline is the broadest possible context framing an expert's knowledge. The discipline is a top-level primitive context framing the hierarchy. The test of whether a prospective context is primitive within a hierarchy is whether the only possible broader context which can frame that context within the hierarchy is the discipline.

The method then selects the top-level primitive context of the discipline. Each discipline possesses a top-level or founding primitive context, the set of primitive sub-contexts of the founding primitive context and an entire hierarchy of their sub-contexts which serve to fully define and contextualize the concepts within the entire discipline. The expert must identify the context which, when subordinated to the context of the discipline frames the learning hierarchies and provides contextual continuity between the discipline and the learning hierarchies.

The method then identifies the top-level primitive contexts which, taken together, frame all of the contexts of the practice of the discipline. These contexts are primitive to the learning hierarchies by virtue of the fact that they indicate the practice (or teaching) of the expertise of the discipline which begins when there is new information and new meanings to be discovered. The name of each primitive context is its statement of context. The method further names each primitive context to frame the full range of sub-contexts of the primitive.

After identifying the top-level primitive contexts, the method orders the primitive contexts according to logical and contextual precedence. The logical precedence of contexts corresponds to the order in which meanings propagate from one context through other same-level contexts. In instances where primitive contexts do not share meanings or precedent contexts the order of the contexts can be assigned arbitrarily. The method then names sub-contexts of the primitive contexts. Consider all these meanings as sub-contexts inherent to the discipline and assign them to the primitive contexts which frame them. Sort and subordinate as many sub-contexts as necessary to completely explicate all constituent meanings of the primitive contexts.

The inventive method describes ontological buildups of different definitions in different domains using some of the most important primitives, from each respective domain, as starting points from which to build out combinations of primitives to create procedures and properties, from these domains, using an etiological progression of one by one logical explication.

Finally the method creates the logic sequence animation depicting the inquiry and presents the logic sequence animation to a student. The student then learns the discipline by following the explicit expert inquiry captured in the logic sequence animation.

DESCRIPTION OF THE INVENTION

Primitives

While primitives exist singularly, they need to be related to other primitives in order to have a contextual meaning. Primitives are discrete senses of mass and symbol that capture pieces/units of language from the perspective of people, their thoughts, feelings, emotions, senses, and actions, combined with the masses and phenomena around them. A relation is any known set of primitives from the present invention's group of domains, including common English. The present invention applies primitives as discrete senses of mass and symbol, as well as discrete utilizations of specific and singular meanings from multiple domains put into direct proximity to one another into algorithms consisting of logical ordered combinations of primitives as they are found in science, English, and the humanities. Primitives are equivalent to concepts, such as time, space, probability, properties, action, emotion, amount, gain, loss, displacement and truth. Each primitive's context-dependent definition represents the decomposition of a concept's meaning into elementary components, in a way that cannot meaningfully be decomposed further. Combinations of primitives can take on deeper more complex meanings.

When primitives are combined, they take on multiple truth values such as truth, hypothetical, empirical, false, and probable. We consider all of the singular concepts within a domain to be primitives. Therefore, throughout the remainder of this document, the terms primitive and singular concept shall be used interchangeably. We state that for purposes of the present invention, that the primitives and the singular concepts upon which domains are based are required to initiate the inventive explicit singular logical breakdown of the rules, definitions, and procedures of domains such as English, Math, Physics, Chemistry, Biology, and Psychology.

The analytic parsing of components by, for example, multiple meanings, multiple procedures, and multiple properties, is used in accordance with the invention to build up a definition of a word. One starts with the generation of multiple protoprimitive words. This is done using a postulated human learning model. These protoprimitive words may be used to build definitions of words in a first level of primitives. "primitives" is used herein in a manner that is more subtle and comprehensive than the current state of the art in semantic primes in linguistics. The primitive words may be used to build definitions of words in a second level of primitives called herein combinatorial primitives. These combinatorial primitive words may be used optionally with primitives to build definitions of words in a third level of primitives, which are referred to herein as terminal primitive constructs. The buildup of primitives makes use of the method of etiological prioritization.

Etiological prioritization is based on the inventive original symbolic model of the causative construction (i.e. one meaning builds the next meaning) of singular logical relations which are built from an initiation of sensed masses in patterns, the naming of sensed patterns into words, the description of the relations of masses using specific English language primitives which describe the nature of the pattern of masses in relation to other masses (i.e. mass, mass is mass with mass; this mass is the same as this mass; this mass and this mass equal this mass; this mass or this mass is true; etc), the relations between masses and words and the many hundreds of relations between primitive words and the requisite naming of those relations as described using the inventive combinatorial primitives. This process is built upon a theory and model of discretized human capabilities and learned experiential meanings. Human capabilities and learned experiential meanings are identified as singular primitives and are identified as words and matched to singular parts that make up human capabilities and the inventive model of the experiences of the sensing and understanding of the spatiotemporal physical world. Moreover, etiological prioritization entails the identification, codifying/encoding, and naming, using the primitives from known domains of knowledge, the thoughts (e.g. see, perceive, recognize, etc), feelings, and emotions from other people and the encoding and etiological prioritization of procedures, rules, and definitions from English and other specialized domains.

Every word in the system is built by creating unique combinations of primitives so built using this method of etiological prioritization (see definitions of regret and evade). Every word in the system is mapped along the inventive ordered ontology of the symbolic representation of the logical relations that make up the inventive model of human capability and human experience of the spatiotemporal world and of other people. As the ontology continues to develop, new meanings are built via the combination of singular primitives (into combinatorial primitives—Group (class) II and III) representing human capabilities and experiences, such as senses, recognitions, feelings, belief, generations, combined with the human understanding of primitives not representing human capabilities, such as masses, operators, prepositions, adjectives, pronouns, interjections, verbs, nouns, and probability. We build these into as many contextually unique statements as possible, which make up the inventive model definitions and procedures, which we confirm as identifiable by relativizing these statements into relative sets and searching for matches in books and other references. Each new combination of primitives represents a new context of meaning.

Relative Sets

A relative set is a group of primitives and/or phrases that are can be viewed as equivalent within one particular context/meaning. For example, in the domain of English "regret" could have "I wish I did not" as a relative set. In the domain of math the flight of an airplane could be viewed as relative to the movement of a train, with each sharing the context of time, space, and speed. To find the parameters of a relative set the present invention has as its object finding all the equivalent and synonymous words and phrases in the lexicon. Primitives/singular concepts would be examples of relative sets that the present invention utilizes when founding a domain. Often the relative set meaning in a subdomain is inherited, with modification, from the meaning in a parent domain. For example, the meaning of displacement in psychology is a specialized subset of the possible meanings of displacement found within the domain of English.

For words that are the result of a single concept/primitive, relative sets may be used to list possible words that within the current context of an English language statement have the same singular meaning. That is, relative set words could be used interchangeably within a statement without modifying the meaning of a statement. For example, as long as you establish what "it" is in a sentence or paragraph "it" can be used to represent the relative set values that could be used to describe "it".

For words or combinations of words that are the result of or defined by combinations of multiple primitives, relative sets may be used to rephrase the constituent primitives with analogous words in that exact statement's contexts. All contexts within a statement need to be addressed by the component primitives and their relative sets.

Once a group of primitives combines to define a new concept via the inventive method of etiological prioritization, the concept itself and the combination of primitives are both considered to possess relatively the same concept—one explicitly, the other implicitly. The procedural form (long form) as well as the summarized word/phrase form that is the result of the combination of primitives become relative to one another. That is, they become relative sets that are equivalent once they become understood and can be nested together in one relative set.

The present invention, as it pertains to the domain of English or other domain specific subjects, can choose any English or domain specific word from a group of thousands and allow it to be decomposed into a combination of multiple primitives and the word will be fully contextualized within the scope of the domains of common English usage, physics, math, psychology and other domains so chosen. Words that be thus broken down, as well as domain specific procedures, are considered relative set primitives because they are representative of a combination of multiple primitives but are themselves not known relations/primitives. It is possible to relativize such words, from among a particular combinatorial primitive contexts, such as creating a relative set that consists of the words of "regret" and "lament".

Within a specialized domain, properties, masses, elements, and forces are not considered relative set primitives (e.g. the force of gravity is fundamental to physics), but domain specific primitives, because within the context of the domain they are primitive, and within that particular domain do not need to be further decomposed.

In the domain of common spoken English, domain specific properties, masses, elements and forces can be relative set primitives (e.g. force—can be further decomposed into multiple English primitives, such as effort, trying, belief).

Domain specific primitives are concepts that encapsulate the part of field in such a way that its definition can be broken down but not meaningfully expanded. Domain specific primitives are thus different from the primitives within the domain of English.

Domain specific primitives can form the basis for deriving other domain specific concepts when used in combination with other primitives.

It is possible for primitives within a domain to not solely be symbolically represented by a single word, but rather by a phrase such as "psychological displacement" or "force of gravity".

After some properties have been described as a result of combining primitives, once they are explained they become equivalent properties on a hierarchical tree in the present invention, such that 1 foot would be considered equivalent to 12 inches, and therefore the two phrases could be considered to form a relative set. Properties that can be treated as relative sets include length, mass, weight, area, and volume. Properties are physical characteristics and measurements are primitives.

If there is one context within the primitives of English (words) or within the primitives of a particular domain (words, or statements as seen in the examples) that meanings can share then they are grouped together in a relative set to form that particular set associated with that meaning. In the inventive system there are a finite number of words that can fit into any given context. For example, the relative set of False, would include finite numbers of words, such as incorrect, not, poor, untrue, wrong, erroneous, mistaken, inaccurate, spurious, bad (e.g. bad information), inconsistent, and invalid. A related but separate context of False would be unproven, but it would not be part of the relative set of False, since the context of unproven contains the potential to be hypothetically false as well as the potential to be hypothetically true. Thus, words that would be in the same relative set as unproven would include untested, unknown, unsubstantiated, and undetermined. There is a hierarchical relationship among these words, since Truth comes first in the present invention's ontology as a result of initial sense recognitions (see/perceive/recognize class), followed by the concept of Not Truth. As the ontology develops, the concept of I arises and allows for personalized recognitions to occur. Later in the ontology comes the notion of hypothetical, which is based on the concept that once something has occurred, been recognized, or is true, there is the possibility of it happening or being true in relation to another primitive or set of primitives. Hypothesis entails the thought recognition of a possibility before the empirical recognition of the event or object occurs. The earliest possible initiation of a hypothesis in the present invention's ontology would be the hypothesis that yellow is a color, whereby the primitive components previously only existed as separate unrelated entities in memory (as shown by the exemplary ontology developments below). This would entail randomly generated memories being brought to thought recognition (symbolization into recognizable words and naming of exact sensed masses) and then, as a hypothesis, it can only be confirmed as true when sensorial, word, or text recognition occurs again, but with a matching reality to the random thought. Unproven would stem from this ontological concept of hypothetical, while False would stem from the earlier concept of Not Truth.

Relative set rule: A word can consist of multiple distinct concepts when they come together to form the meaning of the word. The word may then be treated as a symbol that is equivalent to the meaning of the word. The components of a combination of a word are built before the combination is built, but once they are built they can be used interchangeably. For example, "when" includes the primitives of both space and time.

The present invention's main English domain ontology (as well as ontologies that have branched off from English) can contain individual primitives that possess only one word or they may possess relative set words that take on the exact same meaning as one another in that exact context. While later, each of the words may take on different meanings further down in the ontology. For example, "it" and "object" could be considered a relative set at the early stages of the present invention's ontology. Within a specific domain (i.e. other than English), a relative set can also consist of contexts that are etiologically prioritized within the hierarchy as being equivalent with regards to the combinations of multiple primitives that they stem from. For example, within the domain of psychology, the context of a person's perception of their own personality stems from the contexts of their own and other people's perception of the person's own personality (occurring using the same methodology of the present invention's hierarchical ordered ontology), just as the person's own personality stems from a multitude of contexts such as the quality, strengths, and weaknesses of their cognitive ability, which in turn stems from generative (i.e. ability to generate new X with Y relations) or receptive (i.e. ability to recognize X with Y relations from memory) capacity, memory capacity, etc. A person's perception of weakness in their own personality is etiologically derived from the context of their perception of their own personality, and particular X occurrences in public or in private are etiologically derived from the context of needing to understand the weakness. These public or private perceptions are prioritized within in the domain of psychology as being of equal importance. Thus "in private" and "in public" would be relativistically the same and would be considered a relative set. This is an example of two subdomains acting as relative sets of one another. However, once a statement is made regarding some facet of either the public or private nature of the weakness, than the system prioritizes those contexts accordingly. Combinations of primitives as initiated and found in the English ontology are used in combinations to form the constituent contexts, meanings, and properties of domains. Such multiple primitive combinations occur in domains as multiple level contexts, which each can possess one or multiple primitives equating to single words or statements. In one embodiment these combinations of English language primitives provide the ability to relatively fully explicate the contexts of the domain specific meanings. Alternatively in another embodiment, English statements can be used more rigidly, without the English ontology, and simply be built into the explanation of procedures, properties, and other explanations as we exemplify in math, psychology, and physics.

We view sentences, instructions, mathematical equations, procedures, and statements regarding level of truth as algorithms.

Science Example

Science Example. {In} {particle physics}, the {smallest} {masses} {would} {include} {electrons}, {up quarks} {and} {down quarks}. The {next} {explicit relation} that would {occur} {is} that if {they} {are} {within} {proximity} {to} {each} {other} {then} each {changes} the {other}. {When} {groups} of {quarks} {come} into {proximity} {with} {one} {another} {some} of {them} {combine} {to} {form} {larger} {masses}, {such as} {2} {up quarks} {and} {1} {down quark} {combining} {to} {form} {one} {proton} {and} {1} {up quark} {and} {2} {down quarks} {combining} {to} {form} {one} {neutron}. {These} {masses} {possess} {energy} {with} {electrons} {having/possessing} a {negative charge}, {protons} a {positive charge}, {and} {neutrons} a {neutral charge}. {Next}, {with} {random} {movement}, {negative} {and} {positive} {attraction} {between} {protons} {and} {electrons} {begins}. {After} {an} {electron} {is} {attracted} {to} a {proton}, {it} {moves} {towards} the {proton} {and} {then} {it} {moves} {around/rotates/circles/orbits} the {proton}. {This} {is} the {first} {possible} {combination/association} of a {proton} {and} an {electron} {which} {is} {also} the {first} {possible} {generation} of an {atom} {called} {Hydrogen}.

This generation of a hydrogen atom is the first possible generation of an atom in the domain of particle physics, as well as the first possible generation of an atom for someone learning particle physics. Both would be considered generations and would be included in the present invention's ontology. In the above example, both domain specific primitives, such as up quark, proton, and negative charge, and English primitives, such as generation, change, is, and next, are encased in { }. This example is representative of the combinations of primitives that the inventive model uses to explicate, using English, the etiological development of an atom from the primitives of particle physics, in which each statement is the etiological cause of the statement that follows. This process is a further illustration of the technique of singular etiological logical relations (i.e. one logical statement at a time) discussed in conjunction with the domain of algebra. The development of fields such as Chemistry and Physics could be continued in this manner until the domain is explicated in its entirety—i.e. every procedure and property that is known fully explicated in a combination of domain specific primitives and English primitives. The entire domain would then be question and answerable, whereby the English primitives "how" and "why" (and their relative sets) would be inserted at the beginning and conclusion of every explanation.

Initiation of Domains. We are classifying how and why things exist from the perspective of the inventive computerized model of human capabilities recognizing all of the primitives of a subject and how and why each property, procedure, and definition grows out of the primitives and is explained with English strings, and as such the whole system becomes question and answerable.

Properties are related to amounts and to the spatial and temporal dimensions. Each property is a primitive/concept.

Controlling Context. In one embodiment, the controlling context of a statement is based on the truth values contained within a statement, whereby the final truth statement (e.g. true, false) about a procedure as explained in English or a discipline specific procedure is considered by the present invention to be the controlling context. Procedures can also include math concepts such as the amount of space, time, or distance and the gaining, adding or displacing of something. For example, within the statement "I hate you and I regret it", regret is the controlling context, since it is the final statement of truth within the sentence. Any word that associates with I or you must be attached to a truth value, and as such these words will often be the controlling contexts of sentences.

Controlling contexts can exist at the word level and are derived from:

Rules of hierarchically prioritized domain specific knowledge

Rules of hierarchically prioritized natural language primitives

The present invention method of etiological prioritization provides that concepts that appear earlier in the hierarchy provide the necessary context/meaning with which to gain the capacity to understand an as yet not understood context/meaning at the level of singular units of meaning (see the section describing need/requirement).

For example, the human mind would need/require to comprehend the primitive concept of gain prior to gaining the capacity to understand the primitive loss, since it is not feasible in the inventive model of etiological relation to understand loss without first ever having had or known of an object, or thought, about which to lose. Similarly, in cognitive psychology a person's perception of weakness in their personality could not exist without a person first having a perception of their personality/X elements of their personality, and thus the process for prioritizing these domain specific sentence level concepts is the same as that for gain and loss. Furthermore, the present invention provides that these domain sentence level concepts are derived from the word level concepts. The present invention provides a core ontology of words derived from hundreds of English language primitives that would provide the basis for situating the domain specific jargon words, statements, and phrases contained in multiple domain specific ontologies, such as ontologies created for math, physics, chemistry, biology, and psychology.

Word based singular meaning units are contexts once their meaning has been identified and coded as a meaning as it learned through a combination of other meanings/contexts. At this point, a "concept" and a "meaning" mean the same thing at the meaning unit level. Combinations of primitives can be used to form new concepts.

Generating a Domain

Any concept generated by combining singular primitives of English and the primitives of physics, math and psychology that constitute the ontology of common spoken English is considered to be a domain of English, a domain of an entire subject or a subdomain of an entire subject. Biology, Mechanical Engineering, Electrical Engineering and other specialized field words are not included the ontology of common spoken English, since these words are not typically used in common spoken English outside of the context of jargon.

In the present invention, we define an empirical process as an empirical truth (based on at least partial scientific fact or human knowledge found in literature, texts, encyclopedias, dictionaries, etc.) that is observable but not fully understood and/or quantifiable. In the inventive model, a procedure is a truth that is observable and fully understood. If the combined meaning is process oriented or procedural in nature, the meaning can be considered a domain of English, a domain of an entire subject, or a subdomain of an entire subject. For example, gain by itself would not be a domain since gain does not have an explicit procedure associated with it unless it is combined with another word such as mass. The concepts of gain and mass together, however, exist on the present invention's ontological hierarchical ordered levels of contexts (e.g. 1st, 2nd, 3rd) and eventually, once built upon with other primitives according to the inventive method of etiological relations, lead to the creation of a subdomain of the domains of physics or biology. Likewise gain combined with velocity exist on the present invention's ontological hierarchical ordered (number encoded) levels of contexts and leads to the creation of the context of acceleration which is a context that is the basis of subdomains of physics, such as aerospace engineering. Therefore we state that domains have a large expanse of flexibility as to how one determines what they are.

Progression of Truth

The Progression of truth. The progression of truth in the English ontology begins with sense-recognition, then flow to thought recognition, empirical truth, hypothetical theory, and, finally, belief. These truth states are developed using combinations of masses and English language words over the course of progression of the inventive protoprimitive ontology.

1. Improbable hypotheses: An improbable hypothesis is one which the data (the empirical information) indicate that there is less than a 50% chance of being true.

2. Random unknown hypotheses: A random unknown hypothesis is one in which there are insufficient data to determine any probability of outcome of truth.

3. Random equal hypotheses: A random equal hypothesis is one for which there is enough data to say that the probability of truth is 50%.

4. Probable hypotheses: A probable hypothesis is one in which the data indicate that there is over a 50% chance that the hypothesis is true.

5. Statistically certain/unity hypothesis: A statistically certain hypothesis is one in which the data indicate a 100% chance of a hypothesis being true.

6. Null hypothesis: A hypothesis in which the data indicate a 0% chance of the hypothesis being true.

Each of the above types of hypothesis are combinatorial and terminal primitives within the inventive system.

As with all ontologically prioritized concepts/primitives within the present invention's hierarchy, truth values are also composed of a discretized number of primitives. For example, the notion of probable arises when it is recognized that the more times something historically occurred in a given set, the greater the chance that it will happen again, be true again, or be recognized again and when applicable can be measured to ascertain the statistical likelihood other than the basic English definition of greater than 50%. The truth value of probable hypothesis is the result of combining this concept of probable with the primitives of truth, not truth, recognition, and I, in order to express that there is a greater than 50% chance of this hypothesis being true. Likewise another truth value, that of random equal hypothesis, requires the primitives of truth, not truth, recognition, I and random to indicate that the chance of the hypothesis being true is unknown or not recognized. These are two states of truth values and not truth values, amongst many others, that the system utilizes.

Exemplary Learning Theory Process

The present invention is based on specifically identified discretized aspects of human learning and human interaction in 2D/3D coordinate space-time, including learning about senses of mass, senses of symbols, and the codification of those as they represent/symbolize emotion, feeling, senses, time, probability, unique truth values, memory, action, and new generations of thought.

In the present invention, there is an ontological hierarchical prioritization whereby, discretized sensed masses lead to sensed thoughts, which in turn lead to manually software encoded symbolic representations of physical (e.g. touch and holding, pulling and pushing, moving) and mental control (e.g. recognizing, remembering, wanting, thought of moving) in the 2D/3D coordinate environment and in the environment of capabilities of "human interaction" being placed into memory. Multiple encodings of the types of recognition (e.g. perceive, conceive, understand, know, etc.) of this particular form of control, lead to the development of the present invention's concept of "I"/"you"/"they". Any statement in the ontology can have "I" attached to it, such that it can be the that "I see", "I recognize", "it is my thought", "it is their creation", etc. Memory/recognition includes the knowledge encoding of statements of hierarchically prioritized buildups of statements and procedures of known domains, the syntax and order of sensical written English as found in English language texts, and the use of this English to explain known domains. In the present invention, we have encoded symbolic representations/words of recognitions as well as symbolic representations/words of creations.

A procedure is the instructions on how something happens by combining properties and procedures, with words that describe how the two link together or relate in order to work. With English we say that we take the masses, symbols, properties and the procedure, which is the explanation of how the mass, symbol, and property combine to form the definition. Additionally, with experiential/environmental aspects of any of the primitives/concepts in any of the ontologies of domains, the present invention optionally exemplifies any physical attribute or the actual thing itself in lock step with the rules, properties, and procedures of the domain with a pictorial or schematic representation of the object or attribute, be it a physical representation of discrete mass with color and shape, a particle from physics, the constituents of an atom from chemistry, a moving object, a person, a known object, the auditory explanation of an idea, or a geometric form in 2D/3D coordinate space-time.

An Example of how the etiologically prioritized combination of primitives combine to form Displacement within the Ontology and the exemplified methodology for doing so.

Displacement

Example 1

How the Combination of Primitives Combine to Form Displacement within the Ontology and the Exemplified Methodology for Doing so Displacement occurs as a part of a hierarchical prioritization in which you would first gain and then displace or lose the thought/emotion/etc. Properties of displacement would be the gaining or losing of an X capability, where X capability would reflect the exact type of displacement (property).

The present invention initiates an etiological logical progression for these meanings/concepts by instigating each of these ontologically discretized steps, in combinatorial primitives, in a permanent database from where the integral meanings of the system are generated and further developed upon. This is one possible context of a definition of displacement as it might flow through an ontology from the beginning of sense mass→truth→feeling/emotion→question→answer→gain→forward→backward→new→displace.

1. Combine classes of sense with classes of mass to initiate/explain symbol

2. Once the present invention initiates/explains a symbol, the present invention applies it to multiple masses (see exemplary ontology for more information) to initiate/explain a thought about the symbol (truth)

3. You can have a feeling, emotion, or sensation associated with knowing something is true. Emotions, feelings, and sensations are possible for any concept/meaning from this point onward.

4. Once you form a truth you can ask or initiate a question (e.g. what, why, how, and is). Questions can be asked on any concept/meaning from this point onward about any encoded concept and are answered at the end of the correct statement generated that fulfills the parameters of this question. Once a question is asked or initiated, you can initiate an operator (e.g. and, or) and then initiate a reiteration or initiate a new combination of truths and masses to form a change/gain, which is a step required to define the first possible contextual definition displacement.

5. Once a change/gain is recognized it becomes possible to initiate the recognition of a generation 6. At this point in the ontology it becomes possible to realize that masses, thoughts, feelings, and emotions can go forward and backwards, and from there initiate/explain the concepts of time (i.e. past, present, future).

7. Next we introduce a new mass or thought which replaces/displaces one mass, thought, emotion, feeling, or action with another.

8. At this point, we have a meaning of displacement, which is one common usage English definition of the word displacement.

The English meaning of displacement that would stem from the common usage English ontology is the representation of one primitive for another as they can occur or be true in known domains, such as "it" for "red", "circle" for "shape", "happy" for "sad", or "recognize" for "forget". While this ontology has just exemplified one particular English definition of the word displacement, other English definitions of the word are possible as well, and hence components of the ontology will contribute to other combinations of these primitives and other definitions of the word displacement. Moreover, the ontology itself will contribute to defining the meaning of more domain specific concepts, such as the present invention's exemplification of particle physics and psychology (below). Additionally, the present invention's hierarchically prioritized ontology provides the basis for the discrete break down of English language and domain specific statements.

A user can choose to replace specific variables, with regard to change, gain, and displace, in the above ontology with the primitive first principles as they occur in different domains, such as those of physics, chemistry, math, and psychology. The designers of the system as well as the users of the system have the option of putting ontological primitives at any point that a person can have a personalized recognition or a personalized generation. There is also the option for including a feeling or emotion associated with the recognition. The two types of primitive class generations along the ontological hierarchy are the generation of truth states as well as the generation that occurs as a result of being taught/recognizing something. These principles of recognition and generation remain not just in the English branch of the present invention's ontology, but in domain specific branches of the present invention's ontology as well, since the user of the ontology, or the search capability of the ontology to search for past written statements about the topic (e.g. I class, want class, recognition class, generation class), can have a need and want to recognize more relations between the properties and procedures of a specialized domain, such as in the formation of an atom where users can recognize concepts such as the gain that occurs when a proton gains an electron. For example in physics, combinations of masses, truths, and operators can be reinitiated to yield the concept of gain and movement in which several masses move toward another mass. For example, an electron moves toward a proton thereby generating the displacement (the physics form) of position and mass that results in the formation of a Hydrogen atom and this concept can be used as a part of the explication of the process of atom (object/mass generation) formation. The properties of this displacement would be the masses getting displaced (i.e. the proton and electron) and the procedure would be the attraction that occurs between the masses that causes them to come together as well as the English words used to explain this process.

An English word breakdown of this phenomenon is as follows, whereby every step is explicated using English: There is an electron with a negative charge and a proton with a positive charge at a discrete time (X-time) and coordinate space (X,Y coordinate). When/truth two differently/not the same charged particles are/is close to/next to/not touching one another then/next attraction occurs forcing/requiring each particle to come/move close together and the smaller electron to rotate/move around/move around in a circle/continually rotate around the proton.

In the domain of psychology it is called a defense mechanism and a defense mechanism is a subdomain of psychology. The defense mechanism is displacement and it occurs and is encoded at the same juncture in the present invention's ontology as English and physics or it could be encoded on its own as a part of a cognitive psychology domain. The properties of displacement would include the feelings, thoughts, thought actions (e.g. "I move"), senses, and/or emotions that are being switched (i.e. at least 2), while the procedural rule of displacement is characterized by the unconscious (non recognition) desire of the person to switch from a negative feeling, thought, thought action, sense, or emotion to a positive one. The concept of psychological displacement uses concepts directly identified and defined through the present invention's hierarchical ontology such as change, gain, displacement, I/personalization, truth values, hypothetical truth values, operators, and the ability to generate and recognize thoughts, feelings, emotions, etc. Domains, such as psychology, use the ontological breakdown of English words to situate the domain specific terms. Indeed we believe this holds true for all domains as exemplified in this specification through the merging of English words in describing, questioning, and answering physics and psychology. For example, the following demonstrates the combination of primitives that combine to form the primitive displacement interspersed with relative set words that are equivalent to those primitives within the domain of Psychology as it branches off from the domain of common English usage:

Someone generates a statement that "I am unknowing (A truth value that occurs earlier in the ontology and implies that something should be known about X concept)/ignorant (A relative set word for unknowing, meaning a specific set of others—see relative set rules)/not knowing of X primitive concept/procedure/rule in the ontology":

I failed my test and
I later switch or displace my feelings and thoughts about it
I know I really passed the test (I failed my text but I believe I did not is the context of the displacement).

because I have never failed a test in this class before. I now replace the possibility of failing the test with a prior memory of passing all prior tests creating the statement "I passed my test". A displacement has occurred in this statement and we define a meaning of displacement in the psychological domain as such.

and I don't recognize how or why I switched failing a test to passing (unconscious) (I recognize the general loss but when I think how/why I do not recognize it as being true. I only recognize it as being not true—the definition of unconscious in the present invention).

At this point, we have described ontological buildups of different definitions of displacement in different domains using some of the most important primitives, from each respective domain, as starting points from which to build out combinations of primitives to create procedures and properties, from these domains, using an etiological progression of one by one logical explication.

Using a breakdown of domain specific knowledge, such as this example from psychology, it becomes possible to create a question and answer system that will characterize statements according to their component primitives from both the ontologies of English and psychology and use matches between primitive combinations as a means of finding the answers to questions. In other words, the combinations of primitives, properties, procedures, and definitions that are encased in the question will match (partially or completely) the combination of primitives, properties, procedures, and definitions in the answer that will be returned. If an answer is only a partial match to the question, the answer will not be complete and a program will seek out more data.

To create a question and answering system for the present invention's domain of English, the present invention greatly parallels the one laid out herein for specialized domains, in that statements are once again broken down into their hierarchically prioritized component primitives and matches between questions and answers sought within combinations of primitives, properties, procedures, and definitions. The main difference is that for the domain of English, component primitives are drawn from the domain of common spoken English, which will allow questions pertaining to areas germane to common English usage, such as senses, masses, amounts, thoughts, emotions, feelings, and actions.

What makes this questioning and answering capability so extensible is that the words within a statement are encoded to embody multiple meanings/primitives, multiple procedures, and multiple properties. Examples of such common English statements, which we would consider a mixture of properties and procedures, would include "he walked away", "he thought about it for a long time", or "she taught them both how to understand regret". To illustrate how such statements could be broken down, "he walked away" could be broken down into the properties of "he" and "away" (in the context of walk) and into the procedure of "walked".

Likewise, considering the statement, "she taught them both how to understand regret" could be broken into the properties of "she", "them", and "understand", and the procedures of "taught" and "regret". Moreover, the question and answering system could be used to retrieve definitions for individual English domain words and their associated procedural statements and properties, such as displacement. If a question was asked using English words that match the procedural primitive and properties definitions of displacement, the program's answer would return that the procedure of displacement involves first gaining and then displacing or losing the thought, emotion, feeling, or object. A question using English words pertaining to the properties of displacement, would return that the properties of displacement would be the particular thoughts, emotions, feelings, or objects lost, which work to demonstrate the exact context of the concept of displacement.

Another example of how the inventive system could define a context of displacement is:

Xrecognition, true and/with Yrecognition, unknown, currently (stop) Xrecognition, true with Yrecognition, true in the past (stop) Yrecognition, unknown, currently and replaced/ displaces Yrecognition true past—Mind has remembered that it used to know 2 facts/recognitions but remembers only one of them and the other is now unknown so we say that the old memory of the correct answer has been forgotten or displaced (relative sets) with the primitive memory of only the relation with X and the primitive Unknown.

The present invention classifies any meaning, whether referring to a mass, action, emotion or other meaning, as being a thought. The present invention utilizes an approach to learning through sensory perception, and is based on the concept of need/requirement, such that previously encoded concepts/meanings provide the necessary context with which to require and allow associated meanings to relate new meanings.

According to this theory of sensory perception a human/computer must first sense a mass before it can begin to symbolize and name the mass. Relations are provided via contextual definitional build into a singular meaning unit (one) and further relations by hieratically prioritizing them based on the order which is required to form the other based on human sense perception of vision/text/symbol/time/coordinate space and need/requirement, such that each level or set of levels directly explained the one above. The present invention starts from classifications that separate and individualize classes of meaning based on known aspects of the human sensory perception experience. These classes put into primitives, which—for example include emotion, thought, action, and feeling. The present invention's domain ontologies work in the same fashion, but at a different level. English primitives and the primitive components of physics and math found within the present invention's ontology of common spoken English operates at the singular word/meaning level (e.g. every primitive/meaning can be described by a single word), whereas other concepts of physics and math and concepts from other domains, such as the humanities, psychology, law, government, etc., can operate at the statement level (e.g. force of gravity=1 primitive (physics); weakness in memory=1 primitive (psychology); calculate speed=1 primitive (math)) with multiple combined primitives forming a distinct ontological level/context, the same way/method as singular words possess distinct and hierarchically prioritized multiple ontological levels. In domains such as physics primitives such as "force of gravity" can be considered class 1 primitives, even though in the domain of English they would be combinatorial in nature. The English ontology thereby serves to explicate the singular meanings, inherent to the build-up of English, Physics, and Math, and their domain specific contexts, so that later they can be used in other domains in implicit statements such that multiple primitives can be used together without each having to be explicitly defined. For example, in saying that particles physics begins with very small masses called electrons, up quarks, and down quarks, one can see the mix of the primitives of English and the primitives of physics being enmeshed together. For example, the present invention initiates a set of known hierarchical prioritizations of levels of contexts, which the present invention arbitrarily starts from the context of a person's perception of their personality, according to the rules, definitions, and procedures as found in the present invention's characterization of the domain of cognitive behavioral psychology as follows:

1. A person's personality
2. A doctor's perception of the functioning of aspects of a person's personality—a person makes a statement and the doctor makes an assessment
2a. the quality, strengths, and weaknesses of a person's cognitive ability—for example, "I am able to figure out how to do the Pythagorean theorem faster than my classmates" which indicates good short term symbolic memory
2b. the quality, strengths, and weaknesses of a person's functionality of their behavioral state—for example, "I behave like a child when I am confronted with an authority figure" which indicates to be able to behave more seriously in front of authority figures
2c. the quality, strengths, and weaknesses of a person's functionality of their emotional state—for example, "I have been depressed for the last month" which indicates the patient needs to be tested for depression
3. A person's perception of their own personality
4. A doctor's perception of a weakness in a person's personality
5. A person's perception of weakness in their own personality—for example "I think my depression is limiting my ability to . . . "
5a. In private—
5b. In public—" . . . interact with my colleagues at work"
6. A doctor's measurement of a person's receptive capacity (i.e. ability to recognize X with Y relations from memory)—the general cognitive ability to remember strings of knowledge
6a. receptive cognitions displayed/thoughts displayed by a person and recorded by a doctor—for example, the ability to remember thoughts like "Ronald Reagan was elected president in 1980"
6b. receptive emotions displayed by a person and recorded by a doctor—for example, "last week my mother was sad because my grandfather did not come to visit her"
6c. receptive behaviors displayed by a person and recorded by a doctor—for example, "I often act scared when confronted with the kind of challenging work such that I have in school this semester"
7. A doctor's measurement of generative capacity (i.e. ability to generate new X with Y relations)—the general cognitive ability to generate strings of knowledge
7a. generative cognitions displayed/thoughts displayed by a person and recorded by a doctor—for example, "I could imagine a sports car powered by a roof mounted solar panel" (a new idea)
7b. generative emotions displayed by a person and recorded by a doctor—for example, "I feel overjoyed because you taught my child to read"
7c. generative behaviors displayed by a person and recorded by a doctor—for example, "After the news I jumped up and down and started singing a song that I just made up"

For specialized domains such as psychology we follow the same hierarchical model of etiological prioritization, whereby primitives are defined using combinations of other primitives from the subject. All of the procedures, definitions, properties, and rules are explicated one logical meaning at a time and encoded into a database.

In order to get from a person's perception of their personality to their perception of weakness in their personality the present invention requires the explication of any number of individual strengths or weaknesses (e.g. X person cannot remember a chain of numbers), such as cognitive ability, functionality of their behavioral state, or functionality of their emotional state. Within any domain, every statement singularly acts as a rationale or partial rationale (how, what, why, who, when, question) for an adjoining contextualized meaning, in and of itself, and the adjoining contextualized meaning serves as the complete or partial answer to a statement of rationale.

The present invention discretizes a domain differently than human beings discretize singular meanings/words in language. That is the present invention does not use singular meanings/words at every step in the ontology, rather here the present invention uses the notion of the smallest number of primitives combined with one another to create a singular context within the domain. Each statement serves to encapsulate only that topic/context of the subject as it's known to be true in that domain.

Every thought has inherent to it a level of probability (a primitive) or randomness (a primitive). The level of probability is measured in increments of iteration, amount, sequence, closeness in time and space. When science cannot measure any of those aforementioned, and mind or computer program has nothing from which to judge a relationship, it is random. The present invention is not determining the exact amount, percentage, of probability, we are just determining whether something is just probable at all, or random at all.

Regret Example

Using the present invention, it becomes possible to break down English language statements, such as "I see you feel bad because you lost your understanding of electrons", into their primitive components. An example of the primitive breakdown of this statement is seen below.

"I (I/You primitive) see (recognized/sense primitive, present primitive) you feel (feeling primitive, present primitive) bad (negative primitive) because you lost (loss primitive, past primitive) your understanding (recognition of a procedure of a mass primitive) of electrons (mass primitive)"

Additionally, the above statement illustrates the concept of primitive belief (i.e. as relativistically composed "I see" which in the stated context has an equivalency to "I believe", since the speaker cannot be certain of the others true feelings without conformation from the person feeling the emotion).

Once an English statement is broken down into its primitive components, it becomes possible for the present invention to map those primitives into statements, and then map those statements into a series of their definitions.

The present invention exemplifies this by demonstrating possible mappings of the primitives of regret, using the primitives that comprise regret and the other English primitives that correspond to the relative sets of question and answer words that relate to regret within an English statement. We state that any statement can be converted into a question or answer format. A statement that starts with primitives that represent the concepts of if, who, what, when where, why or how and their relative sets can be answered with a statement that situates the primitives of the question to the specifics/contexts of the question (e.g. what of the what, when of the when) and situates the primitives of the answer to the specifics/contexts of the answers (e.g. is, that, because, that is how, it is, since, means).

The system can use known domain data encoded in the form of hierarchically prioritized primitives and meanings/concepts to explain itself to the level that the data is delineated. As part of the present invention's ontology, masses, thoughts, emotions, feelings, sensations, actions, and their relative set equivalents, are encoded in sentence structures with one another and include the minimum number of grammatically correct operators, subjects, objects, predicates, and verbs/procedures required to make a sentence, from two primitives on up. In one embodiment, the beginnings of sentences are recognized as having a capital letter or the next letter occurring to the right of a terminal punctuation mark and the end of a sentence is indicated by a terminal punctuation mark, such as a period, semi-colon, colon, question mark, exclamation point, or dash. A question and answer system that could recognize and process mathematical and chemical equations would also possible. Any primitive entered into the system is encoded so that it can search for its identical match or grouping while returning textually or numerically proximital data for us to analyze for future encoding. Every question, every answer, and every word is singularly hierarchically prioritized so that the variable or new primitives introduced in one statement forms the basis of the question or answer to the next referring statement. As such, all primitives, rules, definitions, masses, and procedures can be related or differentiated from one another regardless of the subject matter. For example, electrons are different than emotions, but when you see an electron in a textbook you could have emotions.

Development of Proto-primitives. In accordance with the invention, as alluded to above, it is contemplated that a methodology simulating a possible development of an understanding of concepts in a way similar to that which might be employed by a human being at an early point in development of language. For example, consider a potential sequence of language development that might begin with the display of a red object or mass to an individual. Such a red mass would have to be discernible as being different from things surrounding it and be singular, that is a single red mass. At the same time, the mass must have a singular meaning, that is it must be perceived as red, and not as, for example, a circle or a square. Of course, for this example, the picking of red is a random selection and of arbitrary nature. Nevertheless, it is a starting point for linguistic development in a theoretical development sequence, and in an actual development sequence of proto-primitive terms for use in accordance with the present invention. In other words, this process can be used in accordance with the present invention to generate proto-primitives. Upon sensing the red mass, the individual might be thought of as asking a question and the question used to develop further protoprimitives.

To develop the proto-primitives of an ontology, one reasons through or discovers small statements and combinations of "words" and "sensations" from which "meanings" are derived combinatorially. The goal is to implement in a database the process whereby language is generated out of a finite set of basic pieces.

The process might start with the theoretical individual (who has no knowledge) seeing nothing. Next the individual is shown a green mass. At this point the individual knows nothing. Next the individual might see a red mass together with the green mass. At this point the individual still does not understand or recognize anything. While not understood, however, the information is encoded into memory. Next, the two masses fade to black, a third color. The individual still knows nothing. Next, green appears alone, but the individual still knows nothing.

Next, red reappears. At this point the individual is now presented with sensory inputs which results in a match. "Match" is the first meaning which is learned. The meaning is learned because the individual has seen the color red before in proximity to the color green. Thus, the color green is defined by its contrast to the color red. The idea of a match is thus a concept that can be represented by a proto-primitive word.

Contextual meanings develop rapidly. Meanings are encoded as they arise through generations of recombinations of primitives. For example, consider that the proto-primitives question (i.e. the question form of is), mass (i.e. red and blue), and it have meanings that are understood. Thus one might ask the question, Is red it. This builds the definition of it, and the definition of is. Consider the statements:

Is red color
Is color red
Is red blue

We create a question which requires an answer from somebody conversant in the field (in the case of a system devoted to a specific field such as physics, or more generally every day experience as symbolized by English words and their meanings. This is a generalized approach where colors are a token for a meaning sensation or the like. To understand the generally stated tokenized development of meanings, it is useful to view the same as a literal development of language and or meaning. In this case the logical answer is no/not, which we utilize in the form of a sentence/statement (e.g. blue is not red) which serves as an expression/formula which the inventive method uses to define the next possible concept/meaning/primitive. The system states what it knows, asks what it knows, and recombines until it asks something that is unknown to the system (i.e. that which is not already encoded as an answer). We say that this question is known to a person that is proficient in English and then the answer is encoded into the expert system.

The inventive method of requirement necessitates first a sense of mass and next recognition of the sense of mass. It continues by requiring in its order a word to represent a mass, next a word to represent a word, next a combination of masses and words are used to make more definitionally complex words, statements, and sentences from English and English as it relates to the explication of rules and procedures from specialized domains. Because of the fact that all prior definitions are required to define each word a longer and longer set of combinations are required to define and therefore each new word is more complex than the prior words. However, this does not mean that individually each meaning/word cannot be sometimes simpler, or having less combinations in its own definition of itself outside of it being defined of it being defined by the other prior meanings. Different operators, prepositions, adjectives, pronouns, interjections, verbs, and nouns are defined individually along the ontology using the same requirement based method.

The inventive requirement based method necessitates that meanings are consistently defined first in their most basic forms which we call word meaning and mass relations. These are used to define basic words in relationship to multiple masses in temporal spatial relationships (spatial temporal relationships such as time, movement, and acceleration are defined along the ontology as well). Continuing these relationships of meanings define human based capabilities and experiences, such as recognition, generation, action, want, belief, feelings, and as such meanings are developed in relation to these and in relation to masses. As the ontology continues to develop you have the option of creating meanings via the relations between human capabilities, relations to masses, or both. In the inventive ontology of protoprimitives, primitives, and combinatorial primitives, human based capabilities are also ordered according to the inventive requirement based method as follows: Sense→Recognition→Feeling→I/You→belief→generation→want→action.

Development of protoprimitives can be illustrated by the following sequence of statements followed by a colon and explanation of their significance in the meaning development sequence. The method of sensed colors: The sensor senses differentiated discrete masses, in this case colors, one at a time. This process instigates the inventive etiological (i.e. the inventive method of requirement) method of building up combinations of singular protoprimitives (all singular meanings throughout the system are singular meaning units) which in turn build singular primitives (class 1) and combinations of primitives (classes 2 and 3) and their respective relative sets, by combining discrete mass with primitive constituent meanings units, which we call individual primitives (concepts), to create the inventive model of the constituent primitives of English, physics, math, chemistry and psychology, which make up the inventive model of the foundation of natural language English, from which we build up into more complex sets of meaning, including procedures, properties, rules, and definitions of the domains. Thus begins the inventive abbreviated ontology.

The computer does not possess any meanings in its database and does not possess meaning until it senses the first sensed pair of meanings that have a logical relationship or pattern.

Figure 12:
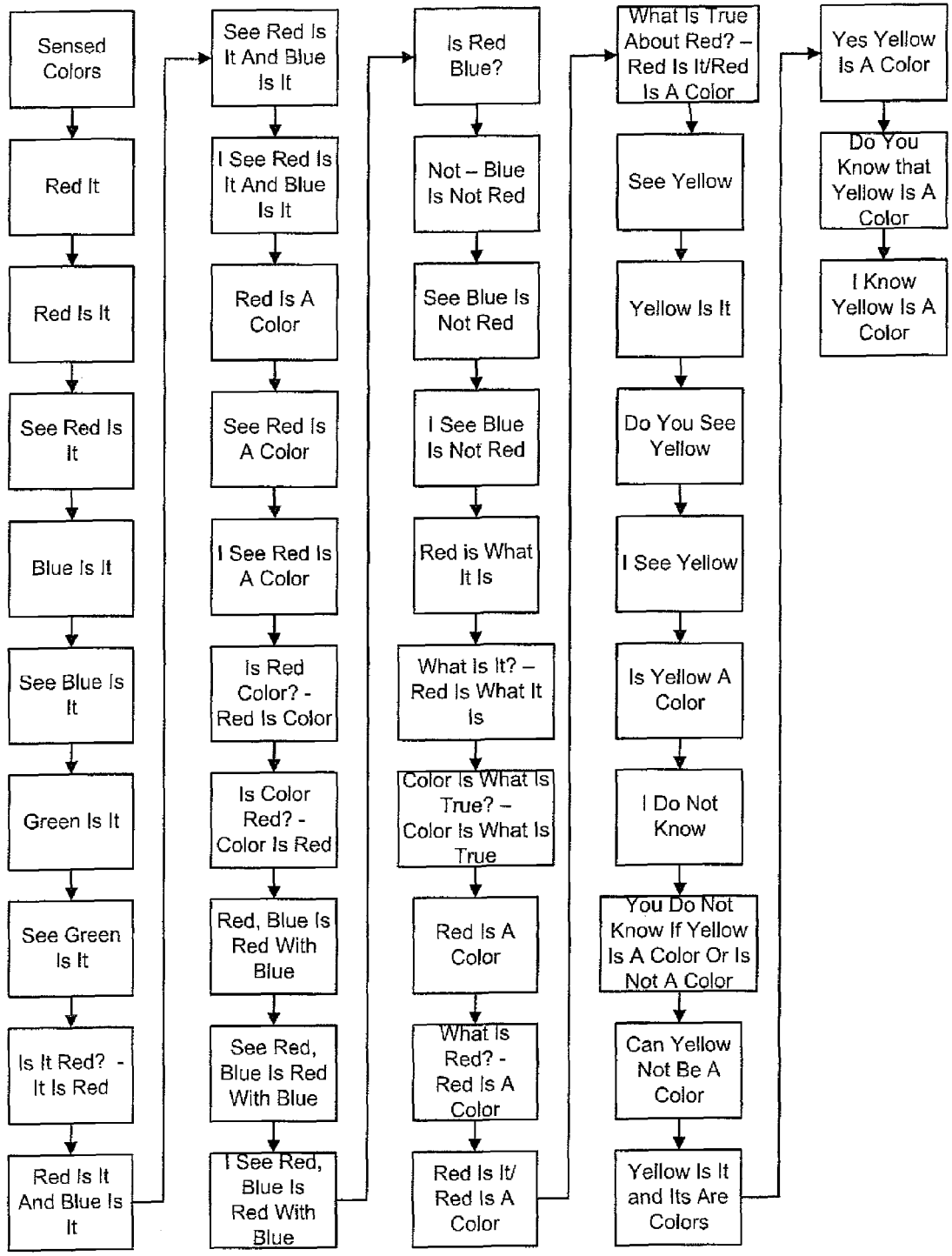
FIG. 12 illustrates a methodology for developing proto-primitives using a theoretical learning model.

One possible development of words and concepts in a sequence of perceptions is illustrated in FIG. 12. Other possible development sequences or analogs of the disclosed development sequences (eg sound or shape instead of color) may be used. Sensed colors (red, green, and blue): singular colors seen for the first time by an integrated sensor capable of differentiating the wavelengths of color which the system identifies as linguistic representations which are pre-encoded colors written in English. We state that first a human would need to sense a singular color (green). At this point no logical relation is formed. Next, a person would need to sense a second color (red), but no logical relation is yet formed. Then a third color (black) is sensed, but no logical relation is formed because the person/system does not know what anything is (does not know what color or an object is and does not know what words are). The next color sensed is green, but a human or system still does not form a logical relation because even though it saw green before it does not know what it is. Finally, red is sensed again, at which point a person/the inventive machine recognizes/encodes the first logical relationship, which is that green was in proximity to red in memory, and this proximital relation, as it occurs again for the second time, ignited the logic that the prior relationship existed. The recreation of the first pattern demonstrates that something can be identified by the system for the first time (the first relation of green and red can be related to the second relation of green and red, and we note that if it was simply green black green, green could not be related to green because no relationship could be formed. Green and black cannot occur twice, which is required for a logical relation, without a third color. If all you could sense was green and all you could sense was black a pattern would not be formed (this would apply to any pair of colors). In the inventive system a pattern is defined by a discrete mass/color, which is positioned with another different discrete mass color and which is seen again. The only way that this can occur is for a third color, any color, to separate the color pairs to show that they are repeated and thereby proving that they can exist for some period (i.e. the sensor can be taken away from the first pair and focused on a third mass, and the machine programmed to mimic how a mind would initially formulate a logic relation (thought) in this instance). That first logical relation being that when the pair is reintroduced the mind/machine recognizes what it is seeing for the first time, forming its first logical recognition. This is the minimum combination of masses required to generate the first meaning of object recognition and the naming of these first recognized objects. This is the first possible point at which the logic required to recognize a mass can occur. We note that this is different than a normal pattern, because the inventive model of sensory recognition of masses requires that the pattern be recognizable to a human that does not yet know anything. Our model seeks to replicate how a human uses his experiences to learn meanings and learn the fundamentals of how the world operates and how their capabilities operate.

Red/blue/green it/this: learn that it or this can be associated with a color. We use the first possible proper word to name masses. After we name "red", "red" and "it", we go the next possible step in the hierarchy and we name the other colors that are recognized in memory their required natural language names (blue and green) and "it". The inventive method of requirement requires that only a word that can be used to describe something generally can be used. The system continues to make logical relations by continuing to proximitally place regular English words in proximity to various different patterns of the inventive encoded discrete colors/masses (See section 303) which we use to represent human experiences of spatiotemporal relationships, human interactions, and human capabilities, such as memory, sensation, action, naming, truth, questioning, and answering as well as more complex meanings such as the construction and explicit description of the workings of an atom (see science example) or the human concept of regret. The inventive method of developing the ontology by meanings combining with meanings, to beget logical relationships required to beget new meanings is based on the inventive model of the requirement of a person to first sense masses and recognize and name patterns of sensed masses with English (e.g. it, red, blue). Meanings are created in an explicit manner whereby every possible combination of the least required number of protoprimitives are used to explain the meaning which is required in an order of requirement whereby each meaning adds to each other meaning to form new meanings. Once you find the least possible number then you are able to most explicitly explain/teach the interrelationships of the primitives therein, one meaning at a time whereby there are no other steps a thinker can take to relate between one meaning and another in these exact contexts of meaning, as well as explain the procedures, rules, and definitions, one concept and context at a time. Everything in the system is a primitive, a singular concept, and a meaning. Every meaning is a context in relation to every other meaning but not in and of itself a context. Group 1 primitives are examples of concepts that are the same as meanings and primitives. The only difference is that concepts can be singular primitives or meanings or concepts can be multiple meanings. All primitives are concepts but they can be rolled into larger concepts that require specific requirement based ordered combinations (e.g. I did not want to do it=regret). A part of that "I did not" does not mean regret but is just a collection of individual concepts that are in a statement together. Is/True—Red is it/mass/thing/object|Red is True|Red equals it|Red is correct|Red is right: learn the meaning of is or true for the first time. The system learns that red has an equality to it. After a mass has been recognized and named it has to be confirmed in a pattern as being true (e.g. is, true, correct). In the inventive method, you get "is" by making a relationship of truth. If you were to simply state "red is" the meaning of the word "is" would not be clear, since "red" is not something can be explained as "true" until it is named ("it"). "it" allows for the naming of several masses as sharing an identity/name. When you sense at least two masses you can begin to use statements such as "red is it" and "green is it". The first color is named "red" at the same time as "it" because that is required by English to make the statement true.

See Red is it. One needs a word to call the sensation of sight, which is "see". In other words "see red." We are naming the human capability. The naming of sense (e.g. see) is initiated through the sensing of masses that you can see are true and extant. The same structure of language development is reiterated with a layer of awareness, which one can talk about from the perspective of applying sense to everything that has been recognized.

Is/True—Blue is it/mass/thing/object|Blue is True|Blue equals it|Blue is correct|Blue is right: reinforcing the meaning of is or true See Blue is it Is/True—Green is it/mass/thing/object|Green is True|Green equals it|Green is correct|Green is right: completing the last combination of terms already in the system defining the meaning of is or true.

See green is it

Is it Red/Blue/Green—It is Red/blue/green: The most basic form of question. Once truth is established the first questions must be formed to ask what the ontology knows so far and the answers are likewise necessitated. This combination of "is", "mass", and "it" are the least number of senses of mass and meaning required to generate this most basic form of the primitive meaning question (is question). The answer to this question is used to generate the most basic form of the primitive meaning answer, using the least required senses of mass and meaning. A question using a generalized word (i.e. "it", "is", "word", "color") means that there will be more than one answer to the question. The inventive system requires that "what is green" be asked only after you actually use a word like "it" or "color" which represents "green" or "mass". The inventive system requires that "what is and" be asked only after you have established that "and" is a combiner of meanings. The inventive system requires that "what sense" be asked only after you establish what the different senses represent, like sight, sound, and touch.

Red is it and Blue is it|Red and Blue are it: instantiation of the concept of "and". This next possible meaning is required to be able to turn the combinations of masses and words representing masses into English statements, which requires the addition of an operator "and". Note: in this statement "are" has the same meaning as "is". Words and masses need to be combined and need to be represented as being combined in order to instigate the creation of meanings.

See red is it and blue is it

I see red is it and blue is it: We are naming the first possible representation of a person (I, me, my, him, her, name). The meaning of "I" is instantiated via the sensing (e.g. I see) of the same one object by I and You each communicating the truth of it to each other, since this establishes that I and You are each individually shown to be those that see the same things (See development of I below) therefore proving to each that I and you both see "red". Without the sensing of the truth of the same mass by I and You, I and You could not be instantiated as singular primitive meanings. I and You make each other possible. No other word that does not equate to "I" could be used in this position on the ontology.

Red/green/blue is a color|Red is color and Blue is color|Red and Blue are colors—We use the first possible proper word to name masses. The idea that colors are true and the idea that colors are words and names for sensed wavelengths of masses are encoded. You are required to individually state what the language allows them to be called. "Color" comes before "with" because, using the language of requirement, we first need to describe everything we can know about the single masses before we can begin describing combinations of masses.

See red/green/blue is a color: From this point on in the ontology you have the option of saying see or who sees (I/You) so the other person understands who knows what.

I see red/green/blue is a color

Is red/green/blue color—Red/green/blue is color: a question and answer put together with words in the system Is color red/green/blue—Color is red/green/blue: a question and answer put together with words in the system Red, Blue is Red with Blue|Red, it is Red with it: instantiation of the concept of "with". This next possible meaning is required to be able to turn the sensed adjoinments of two masses and words representing masses into English statements, which requires the addition of an operator "with". Masses cannot be described as being physically combined and proximitally beside each other with a word like "and", but masses can be described as being physically combined together and proximitally beside each other with a word sharing the meaning of "with/together/adjoining". The system cannot be encoded to understand that "Red, Blue" is "Red with Blue" until it understands that "red is" and "blue is". You have to understand that things that combine are true before you come to understand that things that are next to each other are true. Combination creates truth and then from truth comes the ability to identify combinations as being in adjoinment with another.

See red, blue is red with blue

I see red, blue is red with blue

Is red blue: a question put together with words in the system

Not—e.g. blue is not red: The only possible answer to question of previous statement. Not is demonstrated via a statement that has no logical relation. Not cannot be built without first understanding the concepts of red and blue and "is" and "not" is the required word in the language that equates to the logic of the statement "blue is not red". "blue is what red" would not be a logical statement. No other word that does not equate to "not" could be used in this position on the ontology. This combination of two distinct masses and "is" is the least number of meanings and masses required to define this context of "not". This is required to come after not because seeing them together is simpler than asking the question "are they the same".

See blue is not red

I see blue is not red red/green/blue is what it is|red/green/blue is the what it is|red/green/blue is the correct/true what it is What is it/which is it—red/green/blue is what it is|red/green/blue is the what it is|red/green/blue is the correct/true what it is|red/green/blue is the answer: What has its meaning developed. "Is" is differentiated from "what is" since "is" questions seek a yes or a no about the things that it asks, whereas "what is" seeks a yes or a no about whatever the other words in the question represent (e.g. what is it, what color is it, what name is it, etc).

color is what is true|red/blue/green is what is true

What is true/correct—color is what is true/the answer is color/the answer is red/the answer is color is it/the answer is red is it/the answer is red is a color/red is it and blue is it (example of relative set statements): Answer has its meaning assigned at this point as equivalent to "what is true". The system is encoded to ask itself about everything it knows about itself, and this process continues throughout the system. This way the system is always capable of being asked about whatever information it contains.

red is a color what is red—red is a color, the answer is a color, a color is the answer, a color is the correct answer (example of relative set of statements—the order you answer the questions does not matter): At this point, red is not the sensation of a particular color, but is a token stand-in for an unidentified mass.

red is it/red is a color/red is not blue/red is not green/

What is true/correct about red/what is the answer—red is it/red is a color/red is not blue/red is not green (example of relative set statements). Everything the system has calculated as being "true/is" is reiterated at this point.

See yellow: sensor on; senses wavelength yellow.

Yellow is it:

Do you see yellow

I see yellow

Is yellow a color|Is yellow a color you know|Do you know if yellow is a color—we are reiterating the above process where we saw red and asked if it was a color, only this time we do so for the purpose of introducing the next possible primitive meaning. When the question "is" is asked and the system is unable to recognize the answer we encode the next level primitive meaning as the next possible required step on the ontology which is "I do not recognize/know" followed by "can yellow be a color" and "I do not know if yellow is a color or if yellow is not a color".

I do not know|I do not know if yellow is a color—This is the first time the machine says that it does not know You do not know if yellow is a color or is not a color—This statement responds to the statement "I do not know". Once it is given a choice (color), if something equates or is related to color the system is programmed to say that "it can be or it cannot be". The only possible word that can be used is "or". At this juncture the system learns what "or" is by learning that "yellow is a color or is not a color".

Can/could yellow not be a color—The system is programmed to inquire to allow the respondent/developer to answer that something that it does not recognize/know, but which it has sensed, can "possibly" be named in the same way other things have been named before in the system (i.e. if something has been possible before can it be possible now). This is the only way to generate the basic primitive meaning "possible/hypothetical". This comes after "or" because it adds to the meaning of "or" by indicating that you do not know which option is true, but you choose to state that it can be true.

Yellow is it and its are colors|It can/could be yellow is it and its are colors|It hypothetically is/could be yellow is it and its are colors|it can possibly be a color yellow is it and its are colors—when the system responds it responds that it can be possible for a thing that it did not know to be the same as another meaning that was confirmed before. This is a further development of "hypothesis/possible" (the second definition of hypothesis/possible in the inventive system) since one aspect of the answer is known and one aspect not known. What is known is that some words can be colors. Any words coming into the system could hypothetically be identified as a color, name, it, mass, or truth.

Yes/correct/true yellow is a color|the answer is yellow is a color—we state what the correct answer is or the next possible required meaning that can fit from the prior logical relations (e.g. yellow is a color). The system is programmed so that the meanings that are not known can be entered by searching through corpuses via matching statements, questions, definitions, or multiple words found in corpuses of books, or by someone skilled in the theory looking up answers in a reference books and other corpuses.

Do you know that yellow is a color—The question and answer function continues it's iterative questions and answers by asking if this new information is understood/recognized and the machine answers with the correct answer (below).

I know yellow is a color: Once an answer is entered it can reiterate in a statement form.

In the above discussion, colors are stand-ins for discrete token masses. However, it is useful to think of them as colors in order to understand the methodology of meaning development set forth above.

The objective is to find the essential and thus the minimum numbers of primitives that need to be combined to find all of the possible concepts and contexts that a given level of hierarchical prioritization can support.

All of the combinations of these protoprimitives combined form the definitions of the group 1 primitives as shown below.

These protoprimitves are used to define primitives, and the primitives themselves continue to define in combination with each other all the words in the inventive system.

All the nouns (persons, places or things) in the development stated above are programmed into a computer to be true. Facts about English are all externally input into the computer as a database, using the above development, but they are not revealed, i.e. the question must be asked of the theoretical system to develop an answer, as illustrated above. They are only revealed to the user after they are asked. In terms of the system, masses, it, color, nouns, and things which cannot be broken down are not described, unless they require a definition to be understood in more detail. The inventive system is designed to describe everyday meanings in the context of English. More specialized nouns (like cars, hydrogen, etc) can be described and broken down as a part of other domains. Nouns are defined by their names (e.g. red is a color). The inventive methodology describes the concept of I and you, naming, all the concepts that natural language words form to pertain to the concept of I/you, the proximity of a place, colors, basic masses, shapes, size and amount, and how they get their basic meanings from the English language, psychology, and elementary math and physics. Verbs and adjectives are described through combinatorial builds of primitives.

If a computer asks itself everything it knows and then tells you when it does not know then you are left with a limited set of answers of what the answer could be/what the English language permits the answer to be. At every juncture of the ontology, every combination of primitives permits a very specific set of possible known meanings, for example in English or fundamental physics, math, and psychology. As such, we state that prior statements are part of the answer to every question in the system (for example "what is red" could be answered by statements such as "it is red") and further these partial statements can be used to search through corpuses, as detailed herein.

Every protoprimitive is created in the manner exemplified above. Each singular meaning that is built becomes part of the set of primitives at Level I. It is also noted that many of the protoprimitives become Level I primitives, that is simple primitives. Consider the methodology about how to build class 2 and 3. The protoprimitives are built out so as to define English words.

We take sense, truth, not, not true, know, mass, question, possible, hypothesis, and we use those as some of the beginning constituents of the inventive exemplification of regret. We later include many other constituents such as thought, but, displacement, time, probability, I/you, amongst others. We use them as a part of an expert's definition of regret, such as "I thought I created a good idea but in truth I have recognized the idea as being wrong. If I could hypothetically think again on this I would=regret" or "I empirically saw the hypothesis go wrong and I did nothing, later I used better suggestions, but we ran out of time=regret" or "I feel bad due to the unfortunate possibility of how you might lose your home if your savings runs out. If there is something I could do, I would try, but I have no ideas=regret" We note that all words like regret are developed using the same requirement based hierarchical prioritization method.

All of these constituents of regret can be built from protoprimitives as exemplified below:

Development of "and" and "with"
It/thing/something/object/mass is R and/or It/thing/something/object/mass is B/G
   G and R and B is it
   G and R and B are it
   G is it and R is another/also it|G is it and R is another/also it and B is another/also it
   G is/as it and R is/as it too/also|G is it and R it also and B is it also
   G and R are it
   G and/with/add/gain/plus G is GG
   G and/with/add/gain/plus G is GG is gain
   GG and/with/add/gain/plus G is GGG
   GG and/with/add/gain/plus G is GGG is gain
   Development of "I"
   I see red
   Do you see red
   Yes I see red
   Do you see red
   You and I see red
   Development of Positive and Negative
   Part 1
   I see/hear/taste/touch G
   I see/hear/taste/touch B
   which color do you want to see again | which color would you like to see again
   I want/like to see/hear/taste/touch G
   I want/would like to see/hear/taste/touch G again
   I want/would like to see/hear/taste/touch more G
   I am wanting to see/hear/taste/touch G
   I am wanting to see/hear/taste/touch G again
   I am wanting to see/hear/taste/touch more G
   I want/like G
   I want/would like G again
   I want/would like more G
   I want/like that/this/it
   I want/would like more of this/that/it
   I am wanting G
   I am wanting more G
   I am wanting it/that/this
   Part 2
   I see red
   Do you want to see red
   I would not want/like to see red
   I would not want/like to see red again
   Development of New
   Have you seen yellow/Do you know yellow
   No
   This is yellow|Here is Yellow
   I see yellow and it is new|I see yellow and it is new for me
   It is new
   I have not seen it before
   I did not know what it was/is
   Yellow is something new that I know now
   I understand Yellow is new
   I understand Yellow is a new color
   Why
   Yellow is not like anything I know
   Yellow is not like any other color I know
   Yellow is not like red It is important to note that "regret" can also be defined by combinations of Level I primitives, Level I and II primitives, Level I, II and III primitives, etc.

Figure 2:
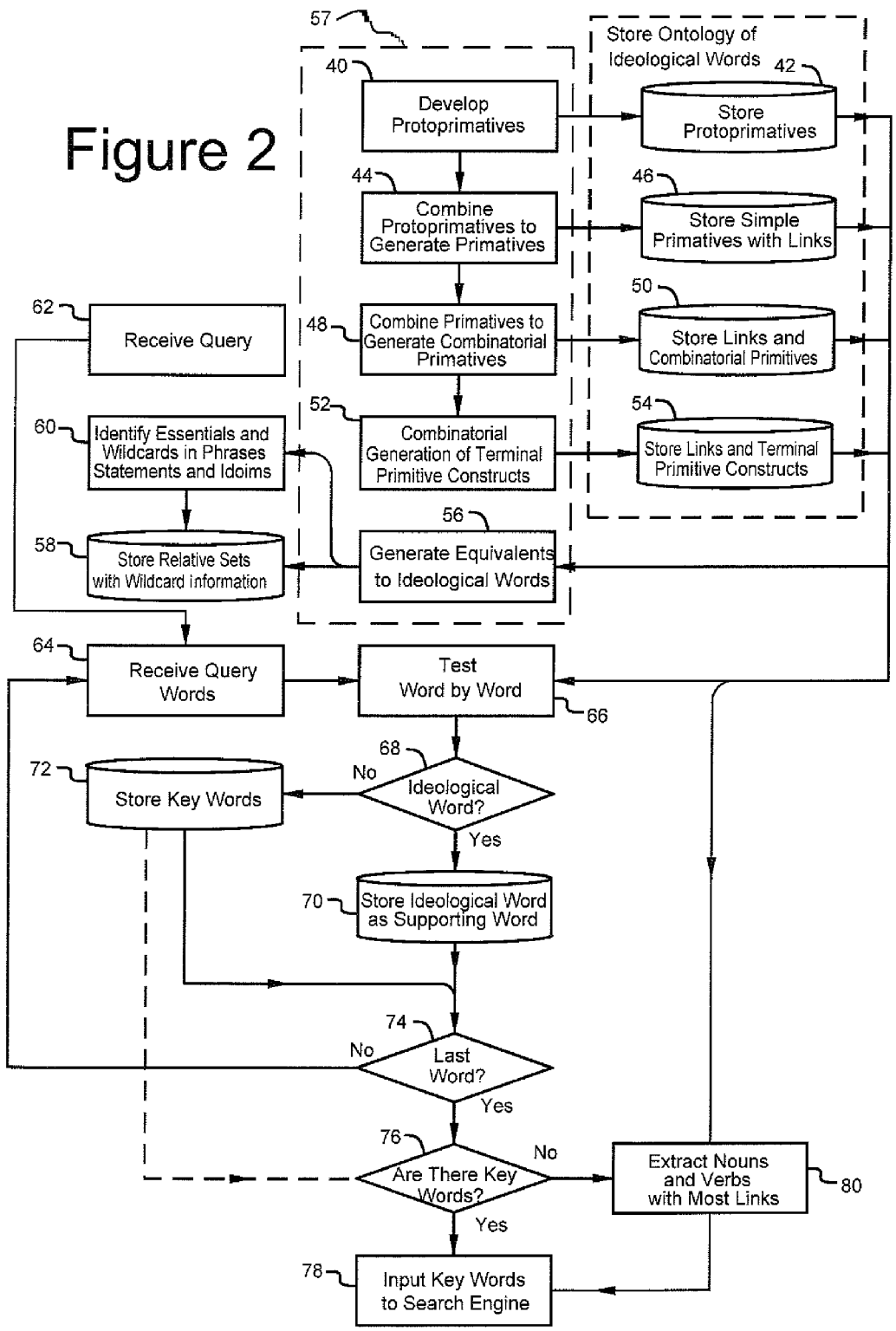
FIG. 2-4 are flow charts illustrating meaning database generation/keyword searching, determination of relative sets and meaning searching in an exemplary embodiment of the method as implemented according to the present invention in a computer system.
Figure 3:
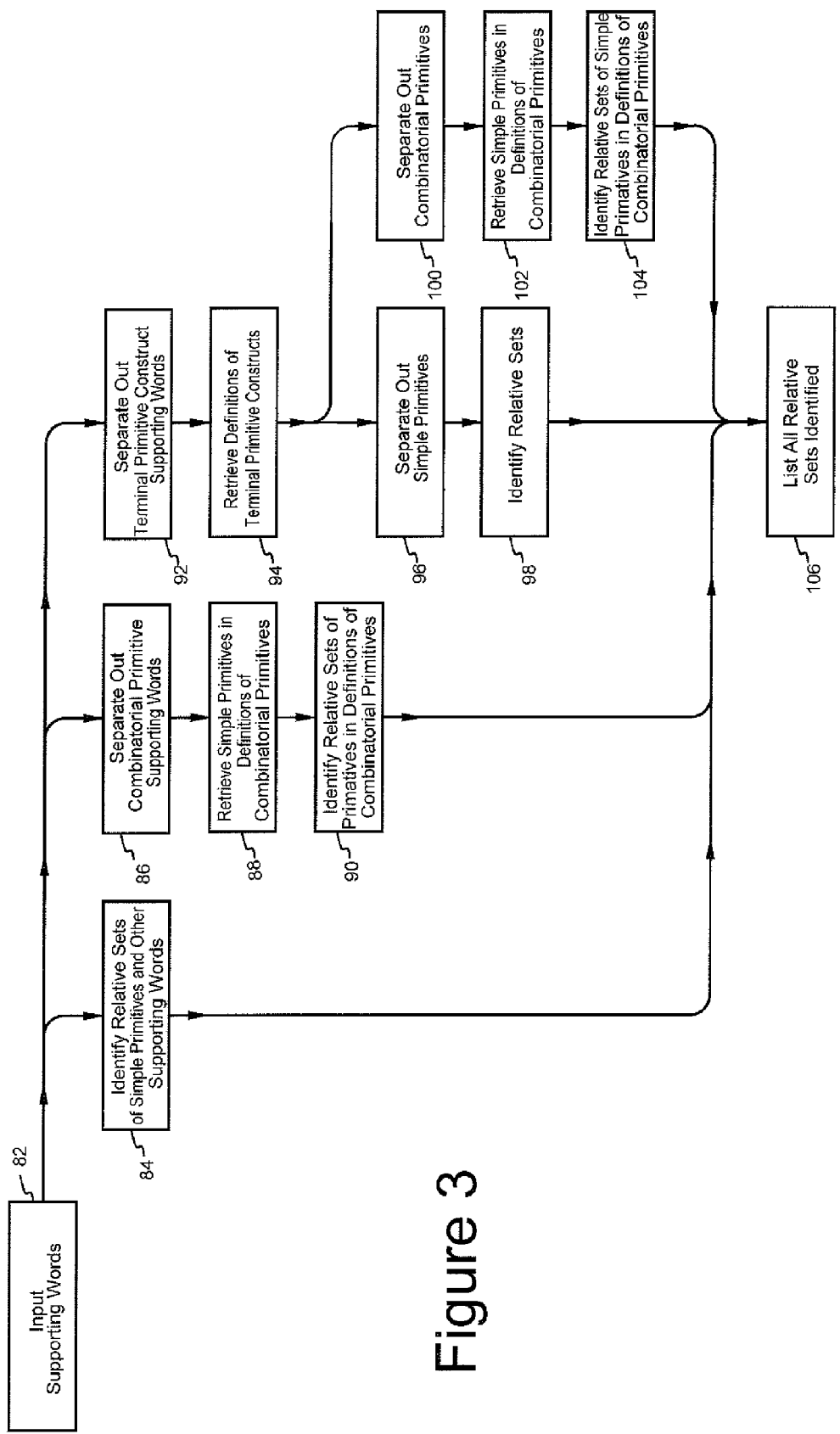
Figure 4:
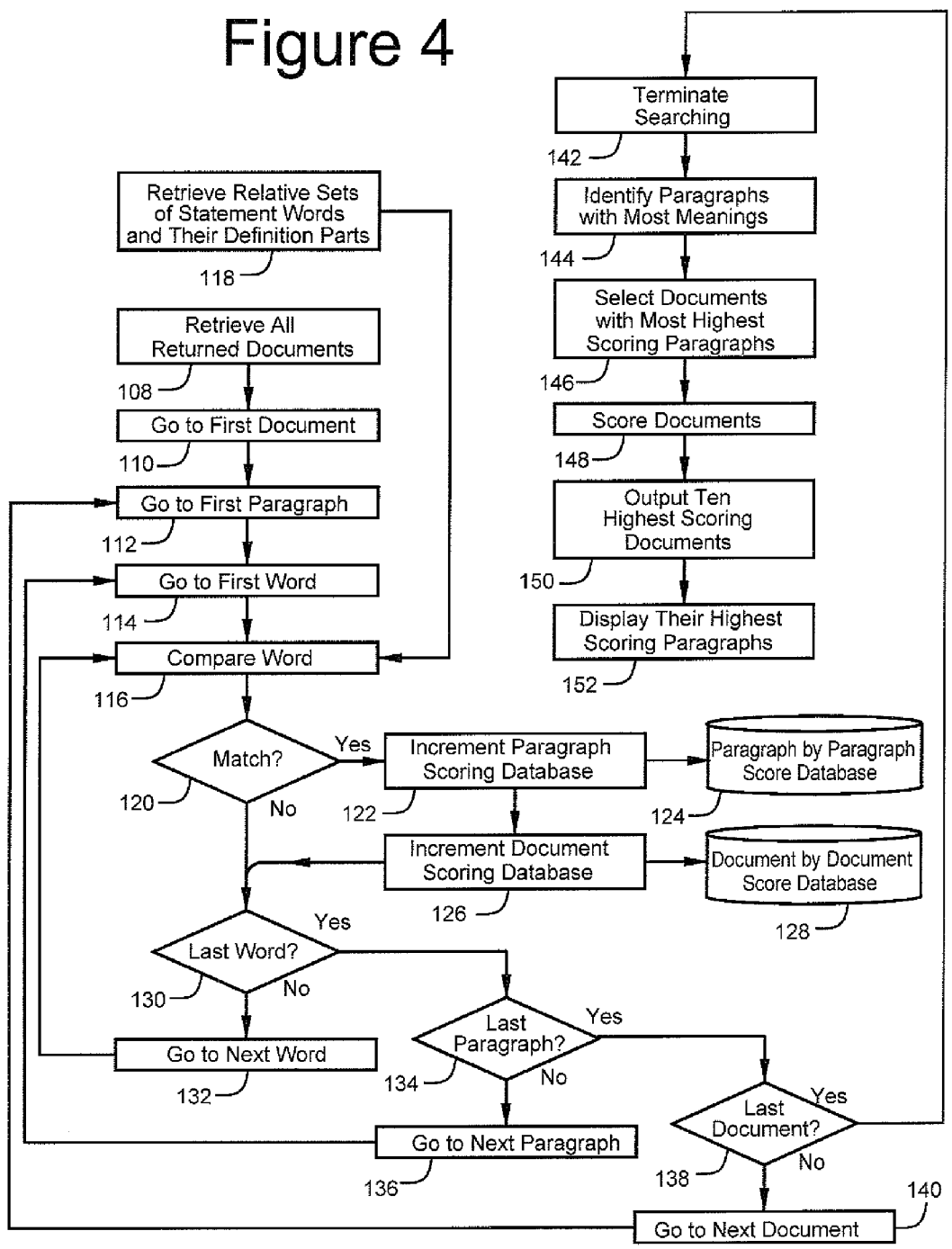

Turning to FIGS. 1-4, the searching method executed by the inventive apparatus may be understood. One of the aspects of the present invention is a methodology which seeks to deal with meaning, for example in the context of a search engine. Software method steps for implementing the methodology of the convention in the form of software controlling the operation of one or more general-purpose computers is illustrated in FIGS. 2-4. More specifically, the invention contemplates the possibility of a layered approach to searching. Such a layered approach involves receiving an inquiry, parsing meaning to determine search words, keyword searching to produce a smaller document set, and etiological searching of the smaller set of documents to produce a search output. If limited computing power and storage is available, the inventive system can piggyback on an existing searching engine, such as a keyword searching engine, or a more complex searching algorithm involving such things as prepackaged search results, Page ranking, and so forth.

An embodiment of the inventive system 10 of the present invention in which an existing search engine, such as the Yahoo search engine, is used as a device for collection and preliminary screening of documents is illustrated in FIG. 1. A query is received at the interface 12 (for example the keyboard) of one of a number of a personal computers 14 used by an individual initiating the query. In a conventional searching system, unlike the system of the present invention, this query is then sent by way of a network, such as the Internet 16 or a corporate network or other cloud, to the interface 18 of a keyword searching device, such as the Yahoo search engine.

In a conventional searching system, this interface 18 communicates with a computer 20. Computer 20 is guided by software 22 to search a database of documents 24, among which it is likely that documents of the information sought in a query may be found.

In accordance with the invention, however, the query is forwarded not to a keyword searching engine, but to the interface 26 of the inventive meaning-based search engine interface for a first tier of processing. Computer 28, guided by software 30, tests the words of the query against a database 32 in accordance with the inventive methodology as set forth in detail below, to develop a number of key words for input into a keyword searching engine.

These key words are then sent by computer 28, by way of a network, such as the Internet 16 or a corporate network or other cloud, to the interface 18 of a keyword searching device, such as the Yahoo search engine. The Yahoo search engine then takes these key words and, operating in accordance with its existing prior art algorithms, outputs a large number of documents, for example a half million documents. A number of these documents are then sent via the Internet 16 to interface 26 of the inventive searching device, which, in accordance with the algorithms described below, searches through these documents in a meaning-based search controlled by ideological searching software 32.

The identified documents are then sent by way of interface 26 and Internet 16 to the personal computer 14 of the person initiating the query. The search results would then appear on monitor 36, in the form of the paragraphs most closely matching the ideological content of the query initiated by the user through interface 12. The user would then have the option of clicking on the paragraphs most likely, in his or her estimation, to have the information sought. If no such paragraphs appear, the user may then request another group of paragraphs, in the manner of a conventional search engine.

In accordance with the invention, it is also contemplated that, as documents are retrieved and their etiological content generated, both documents and their content would be stored by computer 28 on database 38. This would speed the etiological searching of documents tell while at the same time building a database of documents for potential etiological and/or keyword searching.

In accordance with the invention, it is believed that one logical way to build an etiologically organized database of words which is efficiently usable to etiologically parse the meaning of a statement, in a manner familiar to a human being, is to mimic what might be the naturally occurring process by which an individual, starting likely from about the time of birth, begins to learn the meaning of words. In this respect, the understanding of concepts, separate from the words which we use to represent them, is formed in the brain of an infant. Likely, the development of the understanding of concepts and words, at an early stage, is substantially independent. But whether or not that is the case, learning must proceed from very basic foundations from which information may be learned.

In addition, it is also recognized, in accordance with the invention, that a single ontology, while possible, is not the simplest way to achieve the desired results. More particularly, in accordance with the invention, it is contemplated that a separate ontology would be developed for various fields or domains, such as physics, psychology, mathematics and the like. Nonspecialized information, for example that commonly worked with by persons who do not work in such specialized fields as medicine, law, physics, or the like would be served by a nonspecialized database, for example, one typical of people with a certain grade level of education, such as fourth, the eighth or 12th grade. Such a nonspecialized ontology could arbitrarily be termed an English ontology.

As may be understood with reference to FIG. 2, in accordance with the invention, words having meanings corresponding to basic sense detectable items are determined. This group comprises a foundational level of words referred to herein as proto-primitives. These proto-primitives are determined at step 40. In accordance with the invention, proto-primitives may be determined by semantic specialists, but not along conventional semantic grounds but rather from the standpoint of how an individual begins to learn these basic elements. These proto-primitives may be stored in a database at step 42.

The foundational proto-primitives stored at step 42 represent a foundational level of primitives. In accordance with the invention, proto-primitives may logically be combined with each other to form Level I primitives, which may be referred to as simple primitives. Each proto-primitive term used to define a primitive may be viewed as a definition of that primitive.

It is noted that the development of a list of simple primitives need not precede the development of higher level combinatorial primitives and terminal primitive constructs. However, the more complete the list of simple primitives, the easier it is to develop higher-level primitives. In addition, the development of higher-level primitives may inform omissions and inaccuracies in the logical structure of the simple primitives.

Drop this Line

It is important to recognize that the inventive approach contemplates the generation of an ontology of proto-primitives, simple primitives (Level I or Group I), combinatorial primitives (Level II or Group II), and terminal primitive constructs (Level III or Group III), with each term being defined by supporting terms at lower levels. In some cases, because combinations of terms at lower levels may be present in terms in the same level, the definition may, in part, take the form of terms at the same level and accordingly gain a measure of conciseness.

In this specification, the proto-primitives (foundational), simple primitives (Level I), combinatorial primitives (Level II), and terminal primitive constructs (Level III) will generally be referred to as primitives, it is noted that the use of the term "primitives" in this specification differs from the usage generally employed in semantics, but is believed to more precisely fit the needs of the inventive meaning-based parsing techniques.

In addition, in accordance with the present invention, there may be no weighting of supporting terms in the definition of a term. However, in principle, such weighting may be employed in definitions of terms in accordance with the invention.

The next level of development above the proto-primitives is the development of simple primitives. These may also be developed at step 44 by individuals, for example individuals trained in semantics. The process generally involves combining simple primitives and identifying a concept which then takes as its definition the one or more proto-primitives. The concept is then identified with the word in the ontology, and that word takes the proto-primitives from which it was defined as its definition. Once developed, simple primitives may be stored in a database with their definitions for later use at step 46.

Alternatively, words which may be viewed as an important inclusion in an ontology to be used in accordance with the invention may be synthesized from existing words in the ontology, and those existing words become the definition of such words.

The next level of development is the generation of combinatorial primitives at step 48. Here again, development of combinatorial primitives may be done in a forward direction, by combining primitives and identifying the proper term. While primitives tend to symbolize concepts, combinatorial primitives tend to have the characteristics of combined concepts, for example concepts nuanced by other concepts. Combinatorial primitives may be formed from or defined by different combinations of primitives.

A suitable list of simple Level I primitives may consist of the words Mass, Thought, Emotion, Feeling, Sense, Recongition, Generation, Action, Truth, Place, Positive, Negative, Neutral, Not, Is, Personalization, Stop, Continue, Start, Question, Answer, Amount, Name, Again, Gain, Loss, Displace, Move, Change, Time, like, dislike, and, attention, not, direction, a, the, for, because, action/do, real, position, Proximity, from, to, forward, backward, side, Energy, in, out, on, below, over, under, sad, happy, anger, nervous, fear, good, bad, away, smile, frown, land, know, same, different, melancholy, notice, say, read, write, and curious.

Further in accordance with the invention, proto-primitives and primitives may logically be combined with each other to form Level II primitives, which may be referred to as combinatorial primitives. Each proto-primitive and simple primitive used to define a combinatorial primitive may be viewed as a definition of that combinatorial primitive. Once a combinatorial primitive has been defined and identified it is sent, together with its definition to a database at step 50.

Further in accordance with the invention, proto-primitives, primitives and combinatorial primitives may logically be combined at step 52 with each other to form Level III primitives, which may be referred to as terminal primitive constructs. Such development may be done in the forward or backward direction. Each proto-primitive, simple primitive and combinatorial primitive term used to define a terminal primitive construct may be viewed as a definition of that terminal primitive construct. Once a terminal primitive construct has been defined and identified it is sent, together with its definition to a database at step 54.

Terminal primitive constructs may be understood as words which are for the most part substantially fully nuanced. Words recognized as terminal primitive constructs are words which are not believed to be capable of being further nuanced to generate new words.

It is also noted that the organizational scheme of proto-primitives, simple primitives, combinatorial primitives and terminal primitive constructs is somewhat arbitrary, and so far as more or fewer levels may be discerned and an ontology developed in that manner. Thus, it is useful to refer to all the proto-primitives, simple primitives, combinatorial primitives and terminal primitive constructs as primitives.

In this manner, a database of words and their definitions is developed at steps 40, 44, 48 and 52, and definitions of the words are stored together with the words at steps 42, 46, 50 and 54. This information is used during the operation of the inventive interface operating in accordance with the inventive method.

Populating the ontology may be done by testing the combination of proto-primitives or various primitive concepts against existing terms at any level in the ontology to develop additional terms in the ontology. However, it is noted that it is not the object of the ontology to include every word, but only to include words with relatively generalized application.

It is also worth noting that the definitions do not follow the route of entomological construction, which is influenced by migration, goods and technology migration, technology development, war and numerous other factors which are substantially random from the standpoint of word meaning, and accordingly is not reflective of etiological relationships between words. Rather, a synthesized learning has been postulated and development of the ontology proceeds on that basis, resting on the further postulation that the human mind tends to reason out new concepts, perhaps in the same order, and likely using the same links as were employed during the development of knowledge and words associated therewith.

At step 56, people knowledgeable of language, for each primitive (including proto-primitives, simple primitives, combinatorial primitives and terminal primitive constructs) generate a list of words, phrases or other word clusters having substantially the same meaning as that primitive. These words, phrases, idioms or other word clusters (which we can generally refer to as statements) are then associated in a single database paths a relative set at step 58. Each word in a relative set is associated with the relevant set in which it is present. For example, if a relative set, which we could designate as relative set 1, were to comprise the words a, b, c, d and e, the collection of these words would be a relative set associated with the meaning of words a, b, c, d and e. Thus, each relative set may be viewed as being associated with a single meaning which can be expressed as a word, a phrase, or other statement. Moreover, each of the words a, b, c, d and e would have relative set 1 as its relative set.

As alluded to in other parts of this specification, the processing steps 57 involving the generation of the ontology, namely steps 40, 44, 48, 52 and 56, given the state of present technology are best achieved by persons trained in semantics and English. However, as computing software without more sophisticated, these steps may lend themselves to performance with software. Moreover, although these steps are defined in terms of combining primitives at lower levels to form primitives at higher levels, the process can also be performed in reverse, selecting words for inclusion at higher levels and dividing them in terms of lower-level primitives. It is also noted that the same may be an iterative process including combining primitives at lower levels to generate primitives at higher levels and defining primitives at higher levels to be supported by lower-level primitives. Finally, it is also noted that the above process may generate recognition that additional primitives are needed or that words might better be moved from one level to another, or not included within primitives at all.

As noted above, each word and each cluster of words contained within a relative set has a definition comprising proto-primitives, simple primitives, combinatorial primitives and terminal primitive constructs. This definition comprises the meaning of the word, phrase, idioms or other classroom for each. For purposes of searching and matching meaning, the words in the definition of each word in the relative set are assigned essential or wild-card status at step 60 and this information is stored together with the relative step stored at step 58. Generally, essential status is assigned to those definitional words in a particular element of the relative set which would be needed even for a loose match to the meaning of the relative set, while other definitional words in a particular element of the relative set may be viewed as less essential for a less precise match in meaning and may be assigned nonessential wild-card status.

At step 62, a query is received from a user, for example, one using a personal computer 14 or 14*a*, as illustrated in FIG. 1. The quarry is broken up into its individual word components. The word/statement components are received and processed individually at step 64. Each word/statement in the query is tested in serial fashion at step 66. More particularly, at step 68, in serial fashion, each word/statement in the query is compared to the etiological words, namely the proto-primitives stored at step 42, the simple primitives stored at step 46, the combinatorial primitives stored at step 50, and the terminal primitive constructs stored at step 54.

If, at step 68, the word/statement is found to be an etiological word found in the databases storing the proto-primitives stored at step 42, the simple primitives stored at step 46, the combinatorial primitives stored at step 50, and the terminal primitive constructs stored at step 54, that ideological word is denominated a supporting word and stored in a database at 70 for later use as detailed below.

On the other hand, if the word/statement is found not to be an etiological word found in the databases storing the proto-primitives stored at step 42, the simple primitives stored at step 46, the combinatorial primitives stored at step 50, and the terminal primitive constructs stored at step 54, then it is stored in a database as a key word at step 72.

After each word/statement is tested, at step 74 the system determines whether it has reached the last word in the query. If the last word is not been reached, the system returns to step 64 to repeat the above process. On the other hand if the last word has been reached, the system proceeds to step 76 words determine whether or not any keywords have been stored. If keywords have been stored, at step 76 the system proceeds to input at step 78 the key words into a search engine, such as the Yahoo search engine for an initial step of search and document identification.

On the other hand, in the unlikely event that if at step 76 the system determines that no keywords have been stored, the system proceeds to step 80, where the system extracts the definitional components of the meanings in the query, and selects the three (for example) nouns and verbs with the most links to other primitives in the definitions. More potentially, the objective is to select those nouns and verbs which are the most nuanced. The degree to which a noun or verb is nuanced may be gleaned from the number of primitives in its definition. For each of the words/statements in the query, the number of primitives in the definition of the word/statement are counted and the query words/statements with the most number of links are output for forwarding to the search engine as keywords at step 78.

In this manner all words in the query (that is words which are not the proto-primitives stored at step 42, simple primitives stored at step 46, combinatorial primitives stored at step 50, or the terminal primitive constructs stored at step 54) are sent to a keyword search engine, such as Yahoo, and used as keywords during the search. After the search has been completed, the keyword search engine returns a large number of documents which are ranked generally in accordance with the number and frequency with which these documents contain the keywords, and in accordance with other ranking algorithms, such as Page ranking.

Generally, it is expected that the output of the keyword searching engine will comprise many tens of thousands of documents, for example a half million or more documents. Keyword engines rank documents based on numerous factors and matters which are known in the art. Nevertheless, searching for relatively nonstandard information cannot very effectively be done using prior art keyword search engines. The prior art has tried to address the inadequacies of keyword searching by meaning-based searches. Such approaches generally involve an attempt at deciphering the meaning of an inquiry or other statement. However, such attempts have met with relatively poor results.

In accordance with the invention, rather than attempting to deconstruct statements, for example, statements in the English language, the objective is to decipher the meaning or meanings associated with the word and rate documents based on similarity of meaning content.

Put in other terms, the words in the inventive ontology, including for example, words of question, such as "why" or "what," words involving sensory perception, such as "blue" or "green," words of emotion, such as "happy" or "regretful," and so forth all have meanings associated with them. The invention recognizes that the definitions, in the sense that this term is used in this specification, inherently deconstruct the sentence in a generally reliable fashion.

Conversely, words which are not in the ontology of words which may be referred to as "jargon." These jargon words do not have a significant cognitive meaning content, but merely denominate. For example they may denominate a relatively complex structure, such as is denominated by the words "automobile", "architecture", "lemonade", and so forth. Jargon words become the input to the search engine. Once the search engine returns results based on the inclusion and frequency of jargon words, these results may be searched in accordance with the invention for identity in meaning content. That meaning content is defined by the supporting words, which, as noted above, are the words which remain in a query statement after the jargon words are removed.

It is worthwhile to note that the inventive method may be used not only to turn up information, but also to uncover commentary, questions, and other statements whose content relates to the meanings associated with a searched statement.

This may be better understood from the following list which includes a number of combinatorial primitives and some simple primitives which can be combined to define them:

Better: gain, good, positive, make, like.
Clear: make, know, sense, truth.
Block: stop, do, say, not, loss.
New: not, sense, know, time, recognize.
Collect: gain, amount, mass, thought, emotion.
Forget: thought, know, recognize, time, sense. Missing: not, position, place, proximity, loss, displace.
Regret: Truth, thought, personalization, loss, emotion, negative.
Yield: not, stop, action, thought, continue.
Come: move, direction, place, position, displace, forward.
Disagree: know, recognize, not, true, thought.
Farther: amount, distance, time, position, place.
Life: personalization, know, action, time, energy.

Want: like, positive, good, personalization, recognize, again. Stupid: not, know, recognize, personalization, thought. Correct: true, good, positive, real, is.

Likewise, one may understand the meaning aspects of terminal primitive constructs from the following list of terminal primitive constructs and some of the ontology primitives that can be combined to create definitions:

Regret: probability, hypothesis, sorrow, want, not. (regret is an example that has some class 2 definitions and some class 3 definitions).

Stupid: bad, decision, hypothesis, solve, answer. (stupid is an example that has some class 2 definitions and some class 3 definitions)

Contrary: disagree, thought, opinion, different, possess.

Care: give, share, better, kind, positive, emotion.

Success: better, know, want, amount, collect, possess, solve.

Dying: life, time, not, amount, loss.

Fix: make, better, functional, correct, change.

Convince: make, agree, share, probability, belief, agree.

Aversion: dislike, not, want, worse, negative.

Deny: block, disagree, stop, want, not.

Arrogant: correct, believe, yield, not, know. Beyond: farther, distance, proximity, sense, reach.

Fair: better, correct, want, agree, same, true.

Brave: not, yield, emotion, loss, life.

Turning to FIG. 3, at step 82 the non-jargon supporting words are received for processing to develop a meaning inquiry set used to test and rank documents output by a conventional keyword search engine. In accordance with the invention, the relative sets of each of the input supporting words (including simple primitives, combinatorial primitives, and terminal primitive constructs) received at step 82 are identified at step 84.

At step 86, combinatorial primitive supporting words are segregated out, and at step 88 the simple primitives which define these combinatorial primitive supporting words are retrieved. These simple primitives are the simple primitives which make up the definition of the combinatorial primitive supporting word, and accordingly contain its meaning. As noted herein, these definitions may have been arrived at by humans or machines assembling lower-level primitives, or by starting with the combinatorial primitives and defining them using lower-level primitives. At step 90, the system then identifies the relative sets of primitives in definitions of the combinatorial primitives.

In accordance with the invention, the software, at step 92, also separates out terminal primitive constructs supporting words from the supporting words input at step 82. At step 94 the definitions of the terminal primitive constructs are then retrieved. As alluded to herein, these definitions may have been arrived at by humans or machines assembling, for example, lower-level primitives, or by starting with the terminal primitive constructs and defining them using lower-level primitives. When these definitional lower-level primitives are retrieved, they represent the meaning associated with the terminal primitive constructs in the supporting words separated from the query input into the system by the user.

As noted above, the terminal primitive constructs contained in the supporting words separated out from the query input by the user of the system have had their relative sets retrieved at step 84. Also retrieves the relative sets of the words forming the definitions of the terminal primitive constructs. This is done, at step 96, by separating out the simple primitives from the definitions of terminal primitive constructs obtained at step 94. At step 98 the relative sets associated with these simple primitives separated out at step 96 are identified.

The combinatorial primitives contained within the definitions of terminal primitive constructs are also deconstructed for their meaning by separating out at step 100 the combinatorial primitives from the definitions of terminal primitive constructs contained within the supporting words extracted from the user's inquiry. At step 102 the system then retrieves the simple primitives in the separated out combinatorial primitives identified at step 100. At step 104 the system, that is computer system program for the software flow charted in FIGS. 2-4, identifies the relative sets of simple primitives in the definitions of combinatorial primitives separated out at step 100.

When this process has been completed, all relative sets of all supporting words are identified at step 106. The computer system may then proceed to the processing At step 108, all over large numbers of documents returned by the keyword search engine are retrieved in their entirety. For the sake of future searches, these documents may be compressed or otherwise stored for future reference. The system then proceeds to the first document at step 110. At step 112 it goes to the first paragraph of that document, and then at step 114 goes to the first word in the paragraph. At step 116 that word is compared to the words in the relative sets of statement words and their definitional parts, gathered at step 118.

At step 118, all of the relative sets of the supporting statement words identified at step 106 are made available for comparison. If a match is found at step 120 the system proceeds to step 122 where the paragraph from which the word came is scored by being incremented upwardly. The score is saved at step 124. The system then proceeds to step 126, where the document has its score incremented upwardly and this information is stored at step 128. The system then proceeds to step 130 where it is determined whether the last word in the paragraph has been reached. If the last word in the paragraph has not been reached, the system proceeds to step 132 where it has advanced to the next word and step 116 is repeated.

If the last word has been reached, at step 130 the system proceeds to determine whether the last paragraph has been reached at step 134. If the last paragraph is not been reached, the system moves to step 136 where it advances to the next paragraph and returns to step 114.

If the last paragraph has been reached, the system advances to step 138 where it determines whether the last document has been analyzed. If the last document has not been analyzed, the system moves to step 140 where it implements to the next document and returns to step 112 to analyze the first paragraph of the next document.

If the last document has been analyzed, the system moves to begin the output of results at step 142. More particularly, at step 142 searching is terminated. At step 144, the paragraphs which had been incremented during the scoring process with the highest number of matches at step 124 are identified.

In accordance with the preferred embodiment of the invention, the high-scoring documents of the ones containing the highest scoring paragraphs. Alternatively, documents having a large number of paragraphs which have substantial matches may also be ranked relatively high.

The paragraphs with the most meanings identified at step 144 are then used as a basis to select the documents with which they are associated. This selection is made possible by the scoring performed at step 146, where the documents with the high-scoring paragraphs are given the highest scores at step 148. The documents may then be selected out the presentation to the user. Such selection may be done in groups of ten at step 150 starting with the highest scores and working down in response to user initiated requests for further documents. These documents are then displayed to the user at step 152.

In the specification, analogous embodiments are, to the extent practical, numbered with numbers which are a multiple of 100 different from analogous parts in corresponding embodiments.

It is noted that the use of an existing commercial search engine service, such as that which is or may be provided by Yahoo, Google or any other search engine, is an economic expedient for quick implementation of the existing invention. Such an approach takes advantage of the computing power of such prior art services, as well as the very large databases of documents which they contain. However, the invention may be implemented in the context of keyword and etiological searching being performed at a single site.

Figure 5:
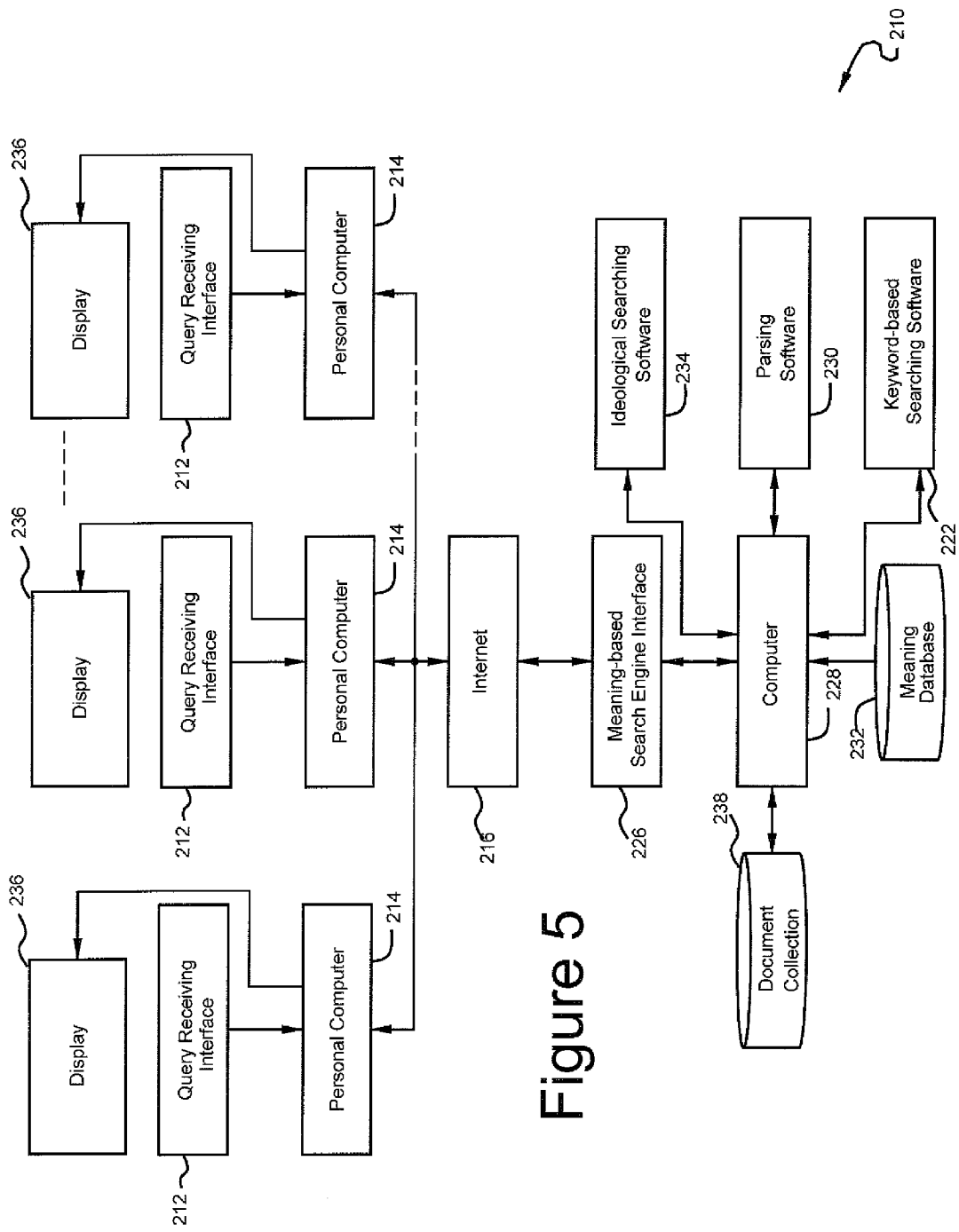
FIG. 5 illustrates an alternative embodiment of the present invention in the context of a single system performing both keyword and meaning-based searching.

Referring to FIG. 5, a computerized searching system 210 accessed by a plurality of users who may all access the system using computers 214 is illustrated. System 210 is similar to the network illustrated in FIG. 1 except that both the keyword based searching software 222, complete document database 238, and ideological searching software 234 (whose operation is illustrated in FIGS. 2-4, are all accessible to a single computer 228 operated by the search engine operator, which performs the entire search.

It is noted that in the embodiment illustrated in FIG. 4, all the relative sets identified in FIG. 3 have been put in a single group with one occurrence of each relevant set. Alternatively, as will be discussed below in connection with an alternative embodiment, the relative sets may be separated into groups, with each group comprising all of the relative sets derived from a single supporting word of the query, and with such a group for each of the supporting words in the query. The objective of the segregation in this alternative embodiment is to provide for the opportunity of scoring a document on each of its supporting words and accordingly identifying those documents which contain relatively full treatments of all the sporting words in the query.

Figure 6:
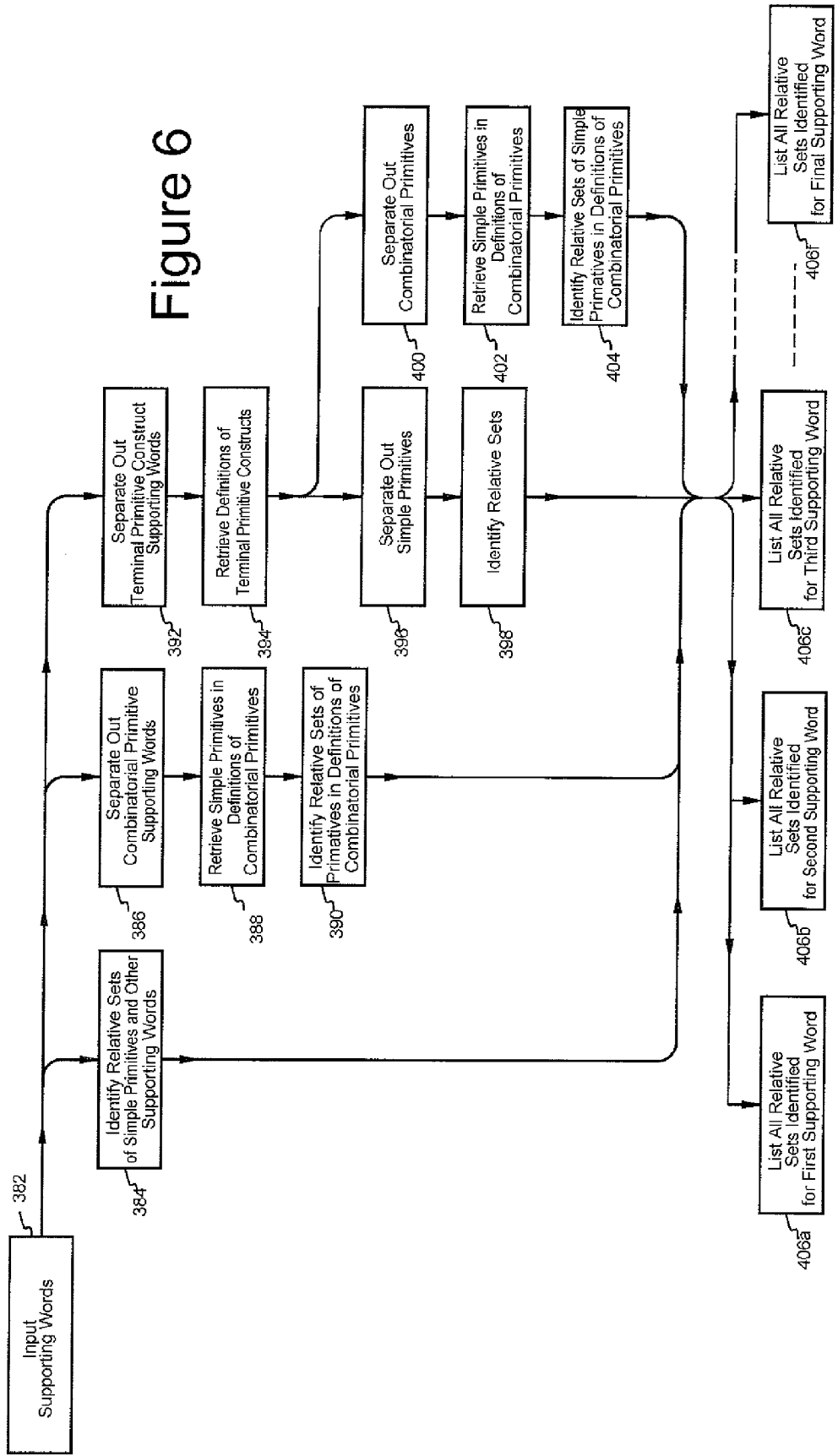
FIG. 6 illustrates an alternative meaning parsing system in which supporting or non-jargon words may be used to rank statements such as paragraphs with respect to each non-jargon word.

Referring to FIG. 6, a method implemented by software for controlling a meaning parsing operation in a computer system is illustrated. In the system, after the keywords have been removed from a query using the method illustrated in FIG. 2, the remaining supporting words are individually input into the system at step 382. The meaning of the same is parsed as described in connection with FIG. 2 in parsing steps 384-404. After the meaning of the first word has been parsed, all relative sets for the first supporting word are identified and stored at step 406*a*.

The process is repeated for the second supporting word using parsing steps 384-404 and all relative sets for the second supporting word are identified and stored at step 406*b*. The process is repeated for the third supporting word using parsing steps 384-404 and all relative sets for the third supporting word are identified and stored at step 406*c*. This process is repeated until the last supporting word is reached. The process is also repeated for the final supporting word using parsing steps 384-404 and all relative sets for the final supporting word are identified and stored at step 406*f*.

At this point, relative sets for each of the supporting words in the query have been identified.

The computer system then takes the documents retrieved by the keyword engine and separately uses the software method illustrated in FIG. 4 to rank each document with respect to each individual supporting word. While various ranking strategies may be used, in accordance with the invention, documents which include meanings corresponding to a greater number, and ideally all, of the supporting words (as indicated by matches with the constituents of the relative sets associated with respective supporting words) are given higher rank.

It is noted that etiological searching using the methodology determined below may also be used without keyword searching as a first tier search. The invention also contemplates the implementation of ideological searching as a first tier search and keyword searching to locate documents more likely stated in terms familiar to the user.

For example, a physicist may perform a search relating to automotive technology using a query containing words familiar to a physicist. On the other hand, the computationally most relevant documents may be equally relevant and may comprise a mixture of documents written by physicists and individuals in the automobile servicing field. It may be desirable to give a higher rank to several documents using the terms of a physicist, as such documents may contain an approach more likely to be understood by a physicist or more likely to be the type of information sought by physicists even if the same were not in the key words. However, it may be that the most relevant documents are those found in the automobile servicing field. In this case relevancy would not be equal, and the documents relating to automobile servicing would be given a higher rank.

As noted above, an important aspect of the inventive system is the use of a limited number of terms to define a primitive set at level I, and relationships in these terms and an intermediate primitive set at Level II. The use of a third Level III built using a similar methodology, or postulated and deconstructed through iterative adjustment of definitions and members at the different levels was also a significant aspect of the inventive methodology. The parsing of meaning by generating Level I simple primitives and primitive definitions of higher-level words, together with the assembly of words into relative sets is one important aspect of the invention.

An understanding of the same may be seen from a consideration of the treatment of the word "evade".

Example: The word "Evade". This is an exemplification of a meaning and relative set database using the TERMINAL primitive CONSTRUCT "evade".

Definitions in the database are indicated by lines such as: $meaning{make} $meaning{unclear}, which illustrate one of the meanings of evade as the combination of the primitives "make" and "unclear". These primitives are surrounded by "$meaning{ }" because this is the Perl programming notation for a hash value that in the context of the inventive system contains the definitions and relative sets associated with the primitive of interest, and thus allows for these other definitions and relative set terms to be used interchangeably with the primitive shown. Thus, the above definition would allow the matching of statements such as "make unclear", "build confusion", "create an enigma", etc.

It is noted that the above three examples, "make unclear", "build confusion", "create an enigma", use different words in combinations which express "evade." However, one could also say "make confusion," "create confusion," or the like. Accordingly, the inventive system retrieves and searches against the lower level primitives which may be found in the definitions of search terms and their definitions. The searching of the relative sets of these terms is believed to make the inventive methodology particularly effective.

Other lines in the database do not contain the notation "$meaning{ }" in any form. These lines are the relative set words and statements. They tend to be words, phrases, statements, and idioms that have the same meaning as the primitive. For example, for evade a relative set would include: "play with the truth" and "conceal"

A substantially complete set of definitions and a relative set for "evade" might take the following form:
Evade—relative set member
Avoid—relative set
run away—relative set
quickly leave—relative set
get out—relative set
move away—relative set
leave—relative set
go—relative set
$meaning{not} answer—definition
Ignore—relative set
try to ignore—relative set
dodge—relative set
$meaning{displace} $meaning{attention}—definition
(displace|change) the (subject|topic|focus)—relative set
switch the thought—relative set
be in denial about—relative set
repress—relative set
hide—relative set
$meaning{elude}—definition
stay away from—relative set
go farther away—relative set
$meaning{trick}—definition
purposefully ($meaning{confuse}|frustrate)—definition
play with the truth—relative set
conceal—relative set
cover—relative set
mask—relative set
$meaning{obfuscate}—definition
$meaning{make} $meaning{unclear}—definition
$meaning{block}—definition
$meaning{not} deal with—definition
$meaning{not} $meaning{know}—definition
$meaning{not} $meaning{want} to $meaning{know}—definition
$meaning{not} $meaning{sense}—definition
look away—relative set
turn around—relative set
$meaning{reverse} $meaning{idea}—definition
$meaning{not} $meaning{accept}—definition
$meaning{not} $meaning{want} to (understand|do|move)—definition
$meaning{want} to $meaning{leave}—definition As can be seen from the above, there are numerous relative set words and numerous combinations of primitives that can yield "evade". When you consider that each primitive in each combination can have its own relative set terms and (if it is a combinatorial primitive) its own combinations of primitives with their own relative sets, you can see how the established entries can be used to match a large diversity of statements that are equivalent to the meaning of evade. This is one of the main features that makes the natural language processing able to readily recognize meanings no matter how they are expressed.

Figure 7:
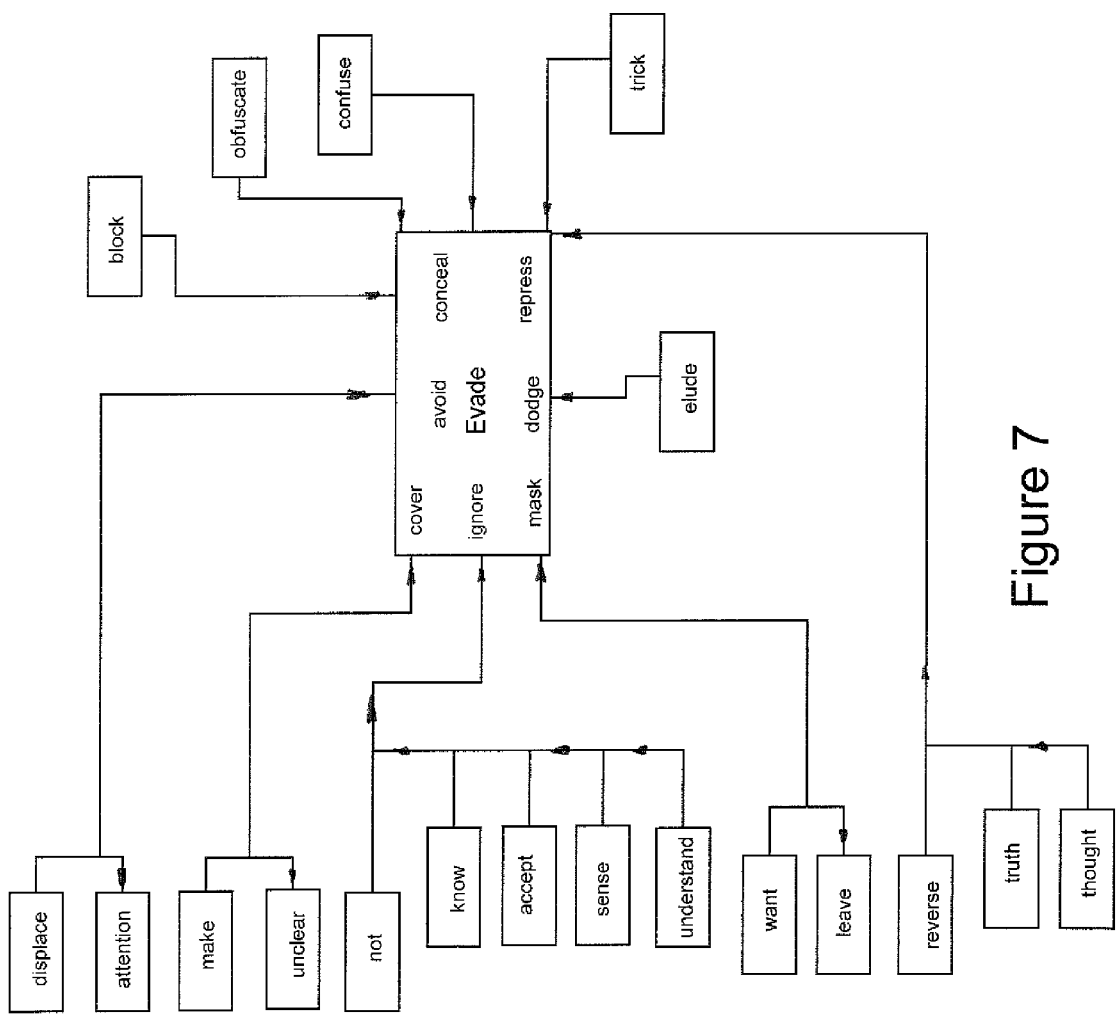
FIG. 7 illustrates a partial visual layout of the relative set for the word "evade" simplified for the purpose of understanding the concepts involved.

A flowchart (simplified to facilitate understanding) of the primitives that combine to build evade is illustrated in FIG. 7.

In accordance with the invention, it is further contemplated that the inventive methods may be used to generate secondary databases which could be used with a variety of techniques to search through documents.

We could have the system automatically define words by going to a place like Google books, reference works, texts, the internet, blogs, newspapers, articles, WordNet, project Gutenberg, and the internet archive, and looking up two class three primitives, such as poor and important. That search will yield statements such as "Twelve countries together account for 80% of the world's poor. In all but one of these tourism is important." Words in the resultant statements are checked to see if they are in the system, and if they are present in the system are ignored (e.g. countries, for, together, percent), but the statement itself would be saved as a correct combination of primitives, which would amount to being a new statement that the system possess in its database which is a contextualization of those eight primitives. The words between the words are brought back into the system and if they fit then the combinations are made into new combinations of primitives that are thereby considered proper correct English strings from references. Words that don't fit are compared against a database of definitions from various sources and all of the different definitions are rechecked in comparison to the system as well. If we find the words share partial definitions to words that we already have then we add those words to the definition that we already have and any words that do not match would be sent back to the definition database to try to capture their meaning. If no definitions are found the words are flagged they are flagged for human encoding using the inventive method of decomposition and combination of primitives. This serves to build up the database Words like account would be identified as foreign to the system and the system could attempt to define it by looking up the primitives found in definitions obtained from online dictionaries, thesauruses, or other ontological sources such as Wordnet. This could lead to definitions for account such as "add up to". If the system cannot find the word and if cannot find a definition that links up to the primitives then it is manually defined according the method.

Every single primitive and word in the system is connected to primitives and their combinatorial definitions. Any word can be vetted an inculcated into the inventive system through new combinations of primitives or through simply being synonymous or idiomatic to what is already in the system.

When we do a data mining for new combinations and new phrases we require that words are in context with other words, and if they are not in context with other words we require the statement itself would be saved as a correct combination of primitives, which would amount to being a new statement that the system possess in its database which is a contextualization of those primitives. If they are not in context to each other we use any parts therein to encode the context in which they are possible to be put into context.

Figure 8:
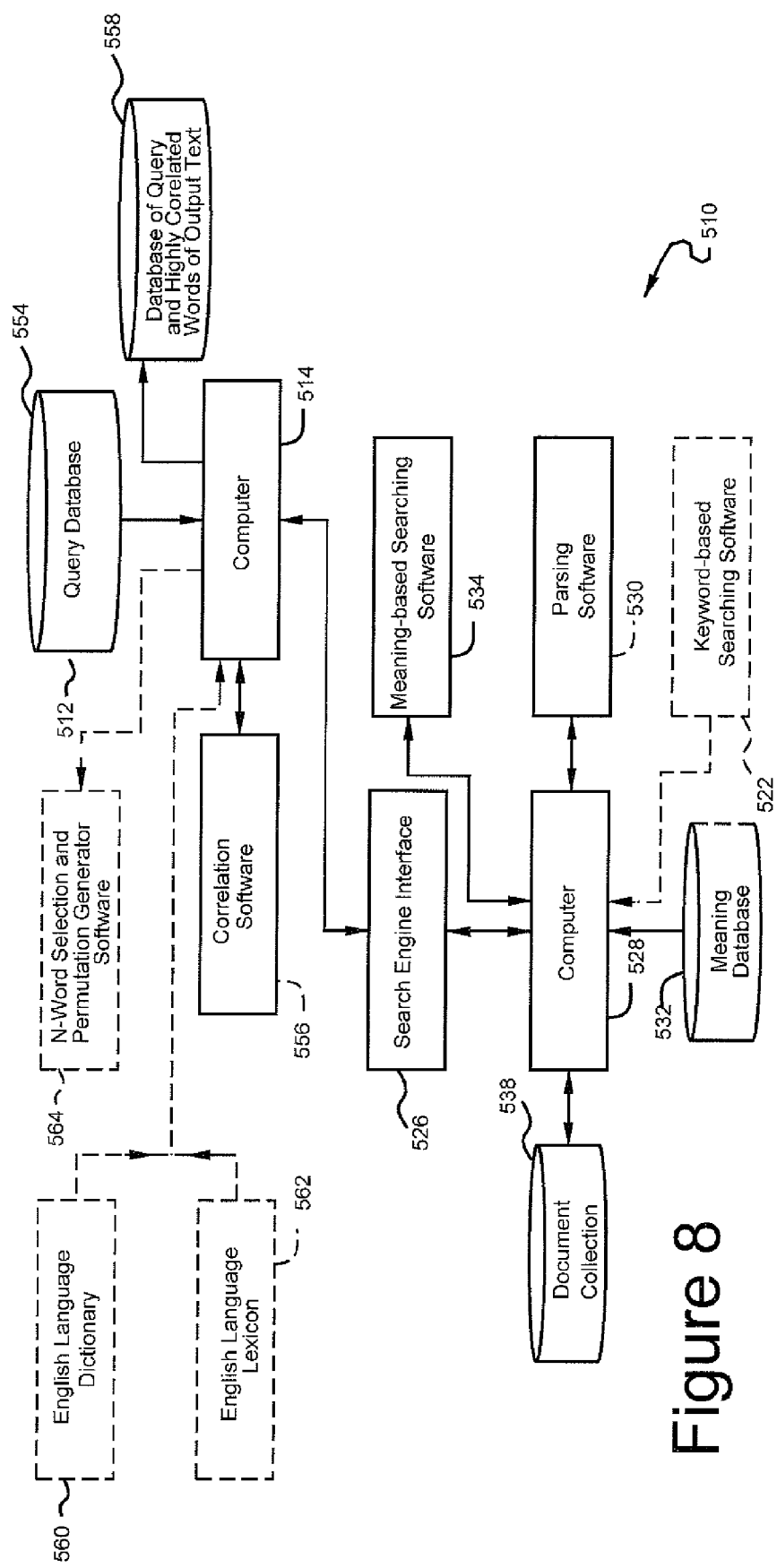
FIG. 8 illustrates a system for generating a database simulating the operation of the present invention.

Referring to FIG. 8, another embodiment of the invention may be understood. In this embodiment, the operation of the inventive system illustrated in FIGS. 1-4 is synthesized into a database. More particularly, in accordance with this embodiment, it is contemplated that a table of queries may be generated together with keyword search terms derived from the queries.

In accordance with this embodiment of the invention, a database operator with a database of consumer queries 554, for example a company like Google, can take these queries which it has received from its users, perhaps over a period of weeks, or even years, and input them into a computer 514 which sends each query through a search engine interface 526 to and a searching computer 528. Searching computer 528 consults a meaning database 532, for example an ontology of the type described in connection with the embodiment of FIGS. 1-4, and using software embodying the methodology of meaning parsing software 530 as described in FIGS. 2-4, consults a document collection 538. Optionally, a keyword-based searching software may be used together with the meaning-based parsing software to search document collection 538, as described above in connection with the embodiment of FIGS. 1-4.

Paragraphs, for example, or other document portions, are then output by computer 528 to interface 526, which sends this information to the computer 514. Computer 514 uses correlation software 556 to determine which words in the output paragraphs are common to a plurality (for example several hundred to several thousand) of output paragraphs output by meaning-based searching computer 528.

Because those words which repeat over and over again in paragraphs output by the meaning-based search engine are extremely highly likely to be meaning equivalents of the query, they will be effective search terms for input into a keyword search in response to the input by a user of the particular query.

Accordingly, each of the queries is stored in database 558 together with the associated words of text output by the meaning-based search which occur repeatedly and often in the various paragraphs or other portions output by the meaning-based search engine.

A keyword search engine may then be used to search the meaning of documents by inputting a query into database 558 and using it to retrieve the highly correlated words of output text, that is the words of text output repeatedly included in the various paragraphs or other portions output by the meaning-based search engine. The advantage of this approach is the use of existing keyword-based search engine infrastructure to perform meaning-based searches.

If desired an additional degree of efficiency may perhaps be obtained by removing certain words from the database 58, such as "the", "a" and so forth.

Alternatively, if there is not an existing query database, one can generate the information in database 558 by using a source of English words 560 or English phrases 562, and generating permutations of selections of these words to create synthetic queries through the use of selection and permutation generator software 564.

Still yet another alternative is to incorporate a keyword-based searching operation controlled by searching software 522 into the operation of computer 528. The use of keyword and meaning-based methodologies produces an intersection set of information which, depending upon information being searched, may be more efficient in controlling further searching.

Figure 9:
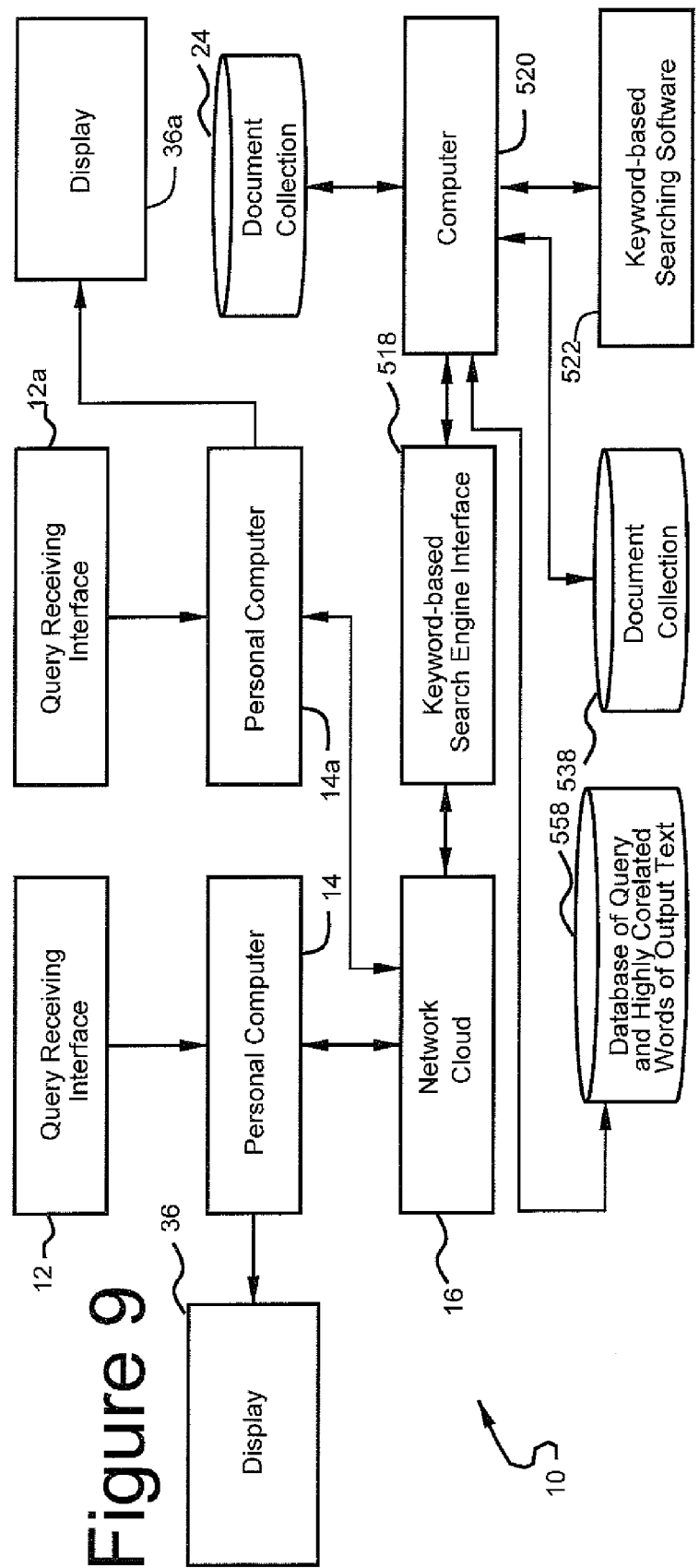
FIG. 9 illustrates a system for using a database simulating the operation of the present invention.

Turning to FIG. 9, if it is desired to use the information contained in database 558, users using personal computers 14 may be connected by the Internet 16 to a keyword-based search engine service by an interface 518 coupled to a computer 520. In response to a query from computer 14, computer 520 takes the received query and sends it to database 558 which returns highly meaning-correlated keywords which are used by the computer system in connection with keyword-based searching software 522. More particularly, the highly meaning-correlated keywords are used with keyword-based searching software 522 to consult a document collection 538, and to output responsive documents in a conventional manner.

Translation

If we convert every word in an inventive ontology to another language, whereby each foreign word is carefully checked to have the same exact meaning or set of meanings that equate to the meaning in each of the inventive English primitives or sets of primitives, then the system is programmed to convert whatever meaning is said in one language to the other to generate a natural language translation. This could be used on the internet, on a home computer, or any other software enabled device.

SPAM Filter

The system could serve as a SPAM filter for Web searches and search engines, because finding results is not dependent upon links present in the document, links pointing to the document, or document popularity, but rather on the meanings present in the document. The system would thus not highly rank documents without substantive content regardless of the number of links pointing to the document, thereby limiting the amount of SPAM or non relevant results. Therefore, our system could be used in conjunction with PageRank-like methodologies to reduce the rank of highly linked documents that do not contain relevant content, and thus prevent the search engine from returning poor quality results and the user from being presented with poor quality results. Moreover, the system could also be used as an Email SPAM filter by excluding emails that contain contexts (within their body, subject, attachments, or embedded links) that are not relevant or not desired by the individual or business.

Voice Recognition

The system could be used as a means of enhancing voice recognition technologies, whereby as the user of the voice recognition software speaks, the system identifies the meanings and the contexts of those meanings present in the user's statements. As the user continues to speak this information is used to narrow down the possible words and phrases that the voice recognition software would have to identify, since not all words and phrases would be valid in all contexts. The system would take identified combinations of primitives in voiced text and match them against known valid combinations of primitives and their relative sets in order to determine the most probable word choices that could come next in the statement, and to verify that the meaning of what they are saying is accurately identified in addition to, or separate from, the phoneme and other characteristics of voice. This could reduce the occurrence of false positives in voice recognition technologies and in doing so greatly improve their accuracy and the time required to manually fix-up dictated documents.

Texting

The inventive method is also the basis of useful tools for immediate impromptu generation (through clicks or touches of keys (i-phone) via rss, e-mail, texting or other)) of super-fast template. This might take the form of pop-up iphone 'meaning buttons' that bring up multiples of pre-coded primitive strings and their requisite possible semantic analogies, i.e. combinations of primitives that by their very nature make up so many sentence structures without resorting to manually thinking them up and typing out each long passage oneself. This would be rather easier to press in quick stabs.

This would enable communications of multiple meanings (into well written paragraphs etc) or conversely the (rss, e-mail, texting or other) easy reception into easy to understand primitives of multiple meanings/paragraphs (see psychology GUI design). This would be a more effective mode of message creation for any type of in-depth communication via a given computer/phone interface. For example forthcoming with primitives of multiple means to "type out" tens of unique of sentences that express "regret" (as one example) uniquely and multiply.

Logic Sequence Animations

In accordance with the invention, the inventive methodology of meeting location may be used to assist the human mind in understanding relatively complex verbal (for example as decoded by a voice recognition software) or textual expression. Typically, an individual listening to a statement is trying to focus in on meaning which may be occurring at different levels, and listening, so to speak, at one level may make it difficult to understand meaning properly classified differently. The inventive engine has a capability of monitoring text at multiple levels and decoding meanings of different genre. It accords with the invention, these may be presented visually as is illustrated in Figures. Any word or statement can be depicted in a GUI design and be used for the domain of cognitive behavioral psychology. As alluded to herein, different primitives may be developed for different domains which branch off from, for example, the inventive English domain.

Figure 13:
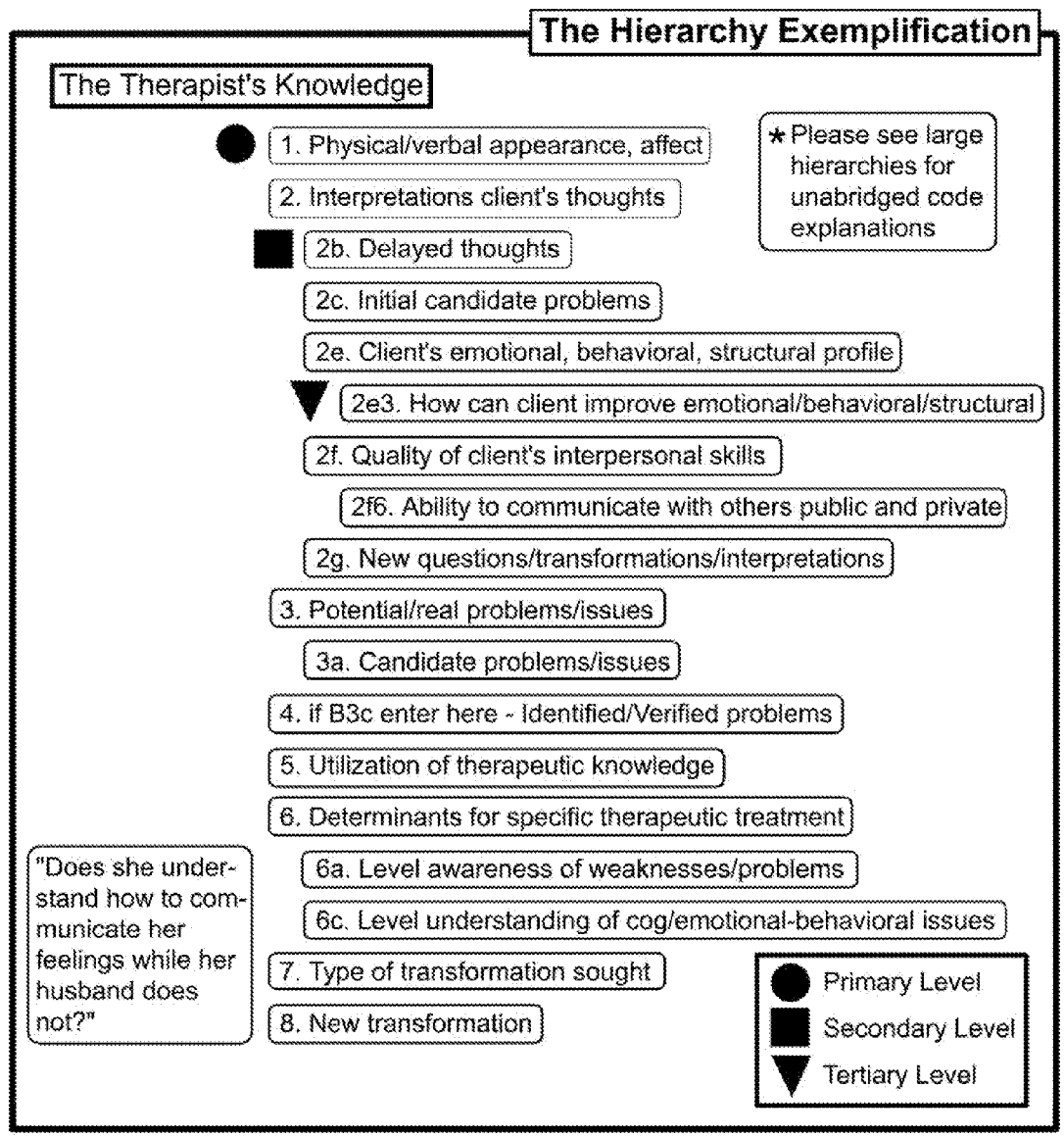
FIGS. 13-17 illustrate an application of the invention in the domain of psychology.

For example, as illustrated in FIG. 13, one of the most important primitives in the field of cognitive behavioral therapy/psychology relate to the knowledge of a therapist. This primitive is thus at the top of a hierarchy of primitives that are required from the concept of etiological causation. One of the lower level primitives in the hierarchy is "interpretations client's thoughts", and "Delayed thoughts" is still lower in the hierarchy. However, "delayed thoughts" is on the same level in the hierarchy as "quality of client's interpersonal skills", as is indicated by the depth of the indentation and the "primary level", "secondary level" and "tertiary level" key in FIG. 13. Thus, for a textual, for example, input like "does she understand how to communicate her feelings while her husband does not" the system will encode the statement based on the primitives illustrated in the hierarchical exemplification of FIG. 13.

Figure 14:
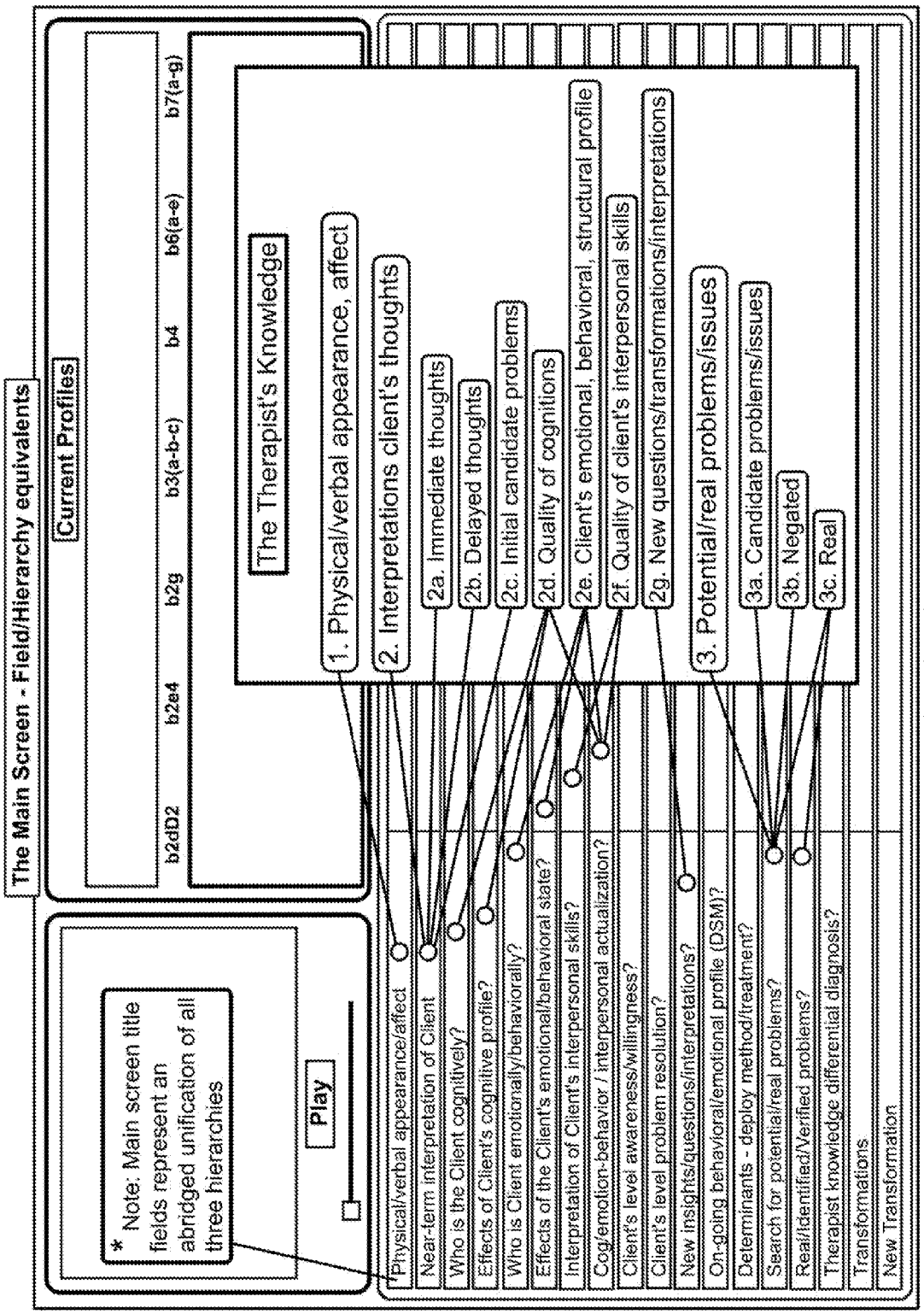
Figure 15:
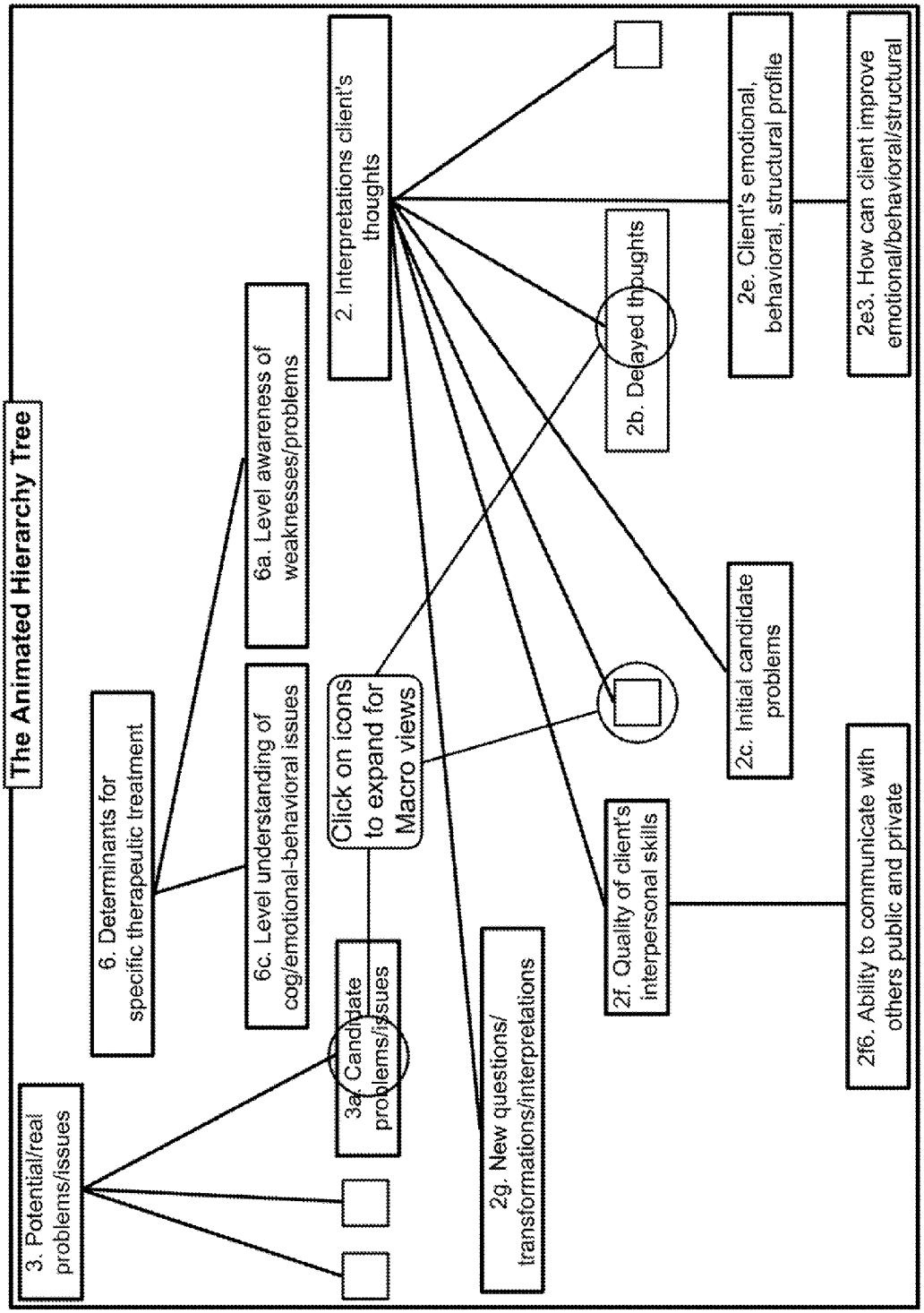
Figure 16:
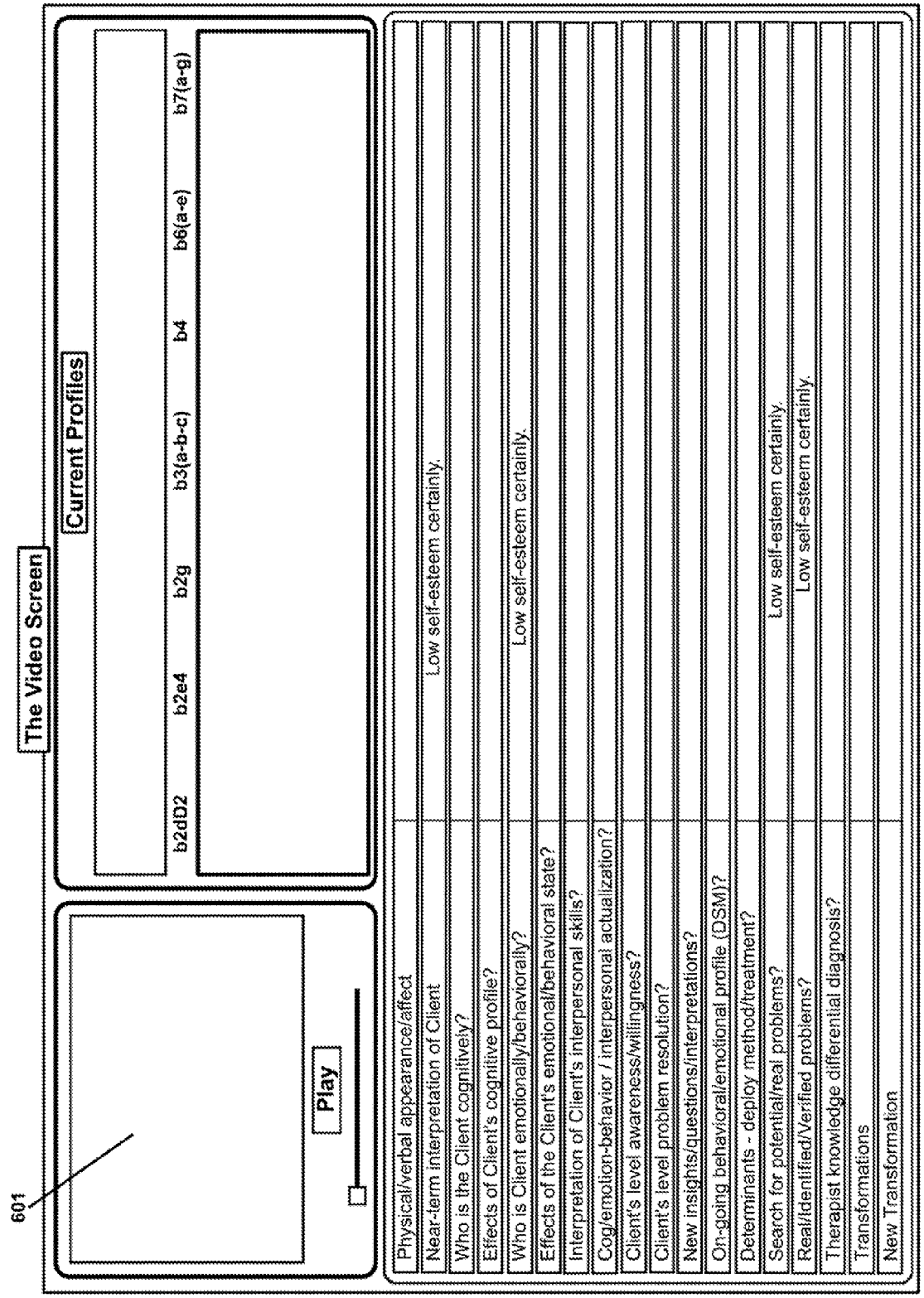
Figure 17A:
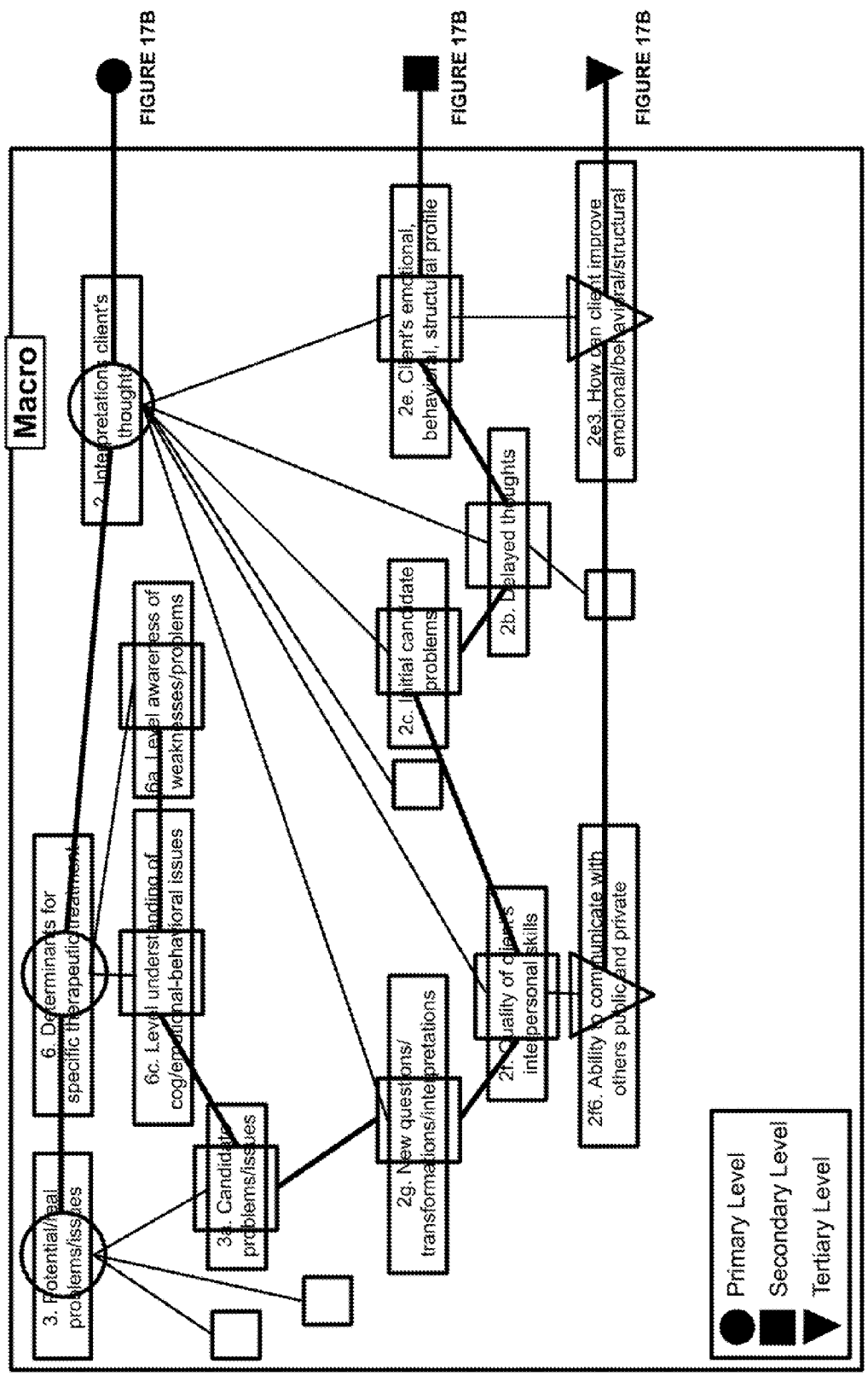
Figure 17B:
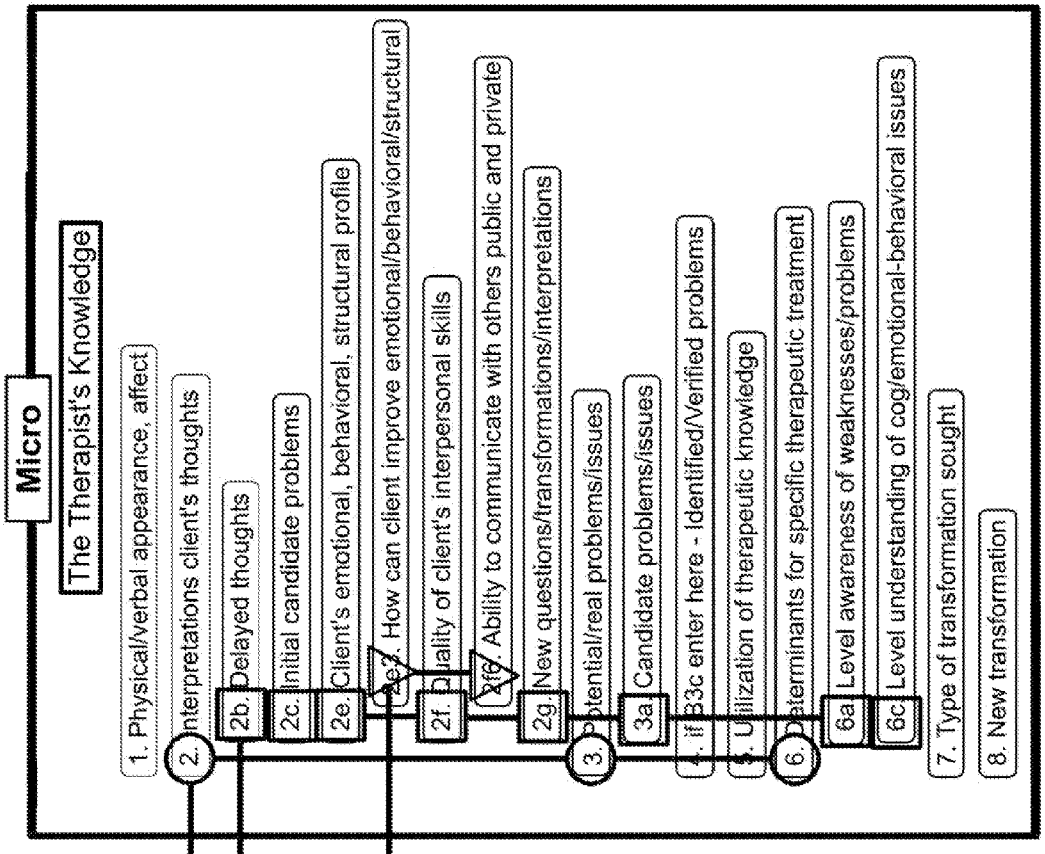

Referring to FIG. 14, a graphic user interface is shown which would represent an abridged unification of the most important primitives in the entire domain such that any information can flow through them and be considered the most general contexts. The generalizations on the left side of FIG. 14 correlate to is the fully explicated primitives shown on the right side of FIG. 14. Referring to FIG. 15, the highest-level view of the some of the primitives in the domain of psychology are illustrated. Referring to FIG. 16, a potential graphic user interface showing, for example, a video 601 of a psychiatrist talking to his patient together with accompanying audio and/or textual transcription may be displayed. At the same time a system using the inventive artificial intelligence system may display singular meanings, in particular in this example the singular concept of low self-esteem, which is associated with the list of other singular concepts on the left side of the graphic user interface. These serve to contextualize the concepts listed on the left. More particularly, low self-esteem is contextualize by four of the top level primitives. FIG. 17 illustrates the equivalency between the highest level hierarchy view illustrated in FIG. 13 which is the automated hierarchy tree of FIG. 15.

The inventive system, or other systems involving a hierarchical prioritization of a domain (English or otherwise), can be encapsulated in an inventive GUI that takes incoming streams of text or voice data and decomposes the statements according to the primitives found within the domain of interest. Each primitive will be encased inside a "ticker" window, which runs parallel to the "ticker" windows for all other displayed primitives. The "ticker" window for each primitive will display any incoming statements that contain the corresponding primitive. In this manner the various component contexts and meanings that comprise any statement will be made available to users of the interface in a readily apparent manner. Where applicable, each ticker window can be clicked on and expanded to display the primitive meanings that combine to form the higher level primitive context represented in the ticker. Each of these component primitives will appear with their own "ticker" and display the precise combination of primitives used to create the meaning equivalent to that of the higher level primitive. Additionally, the primitive meanings and components can also be viewed in a tree like hierarchical display, whereby the top level primitives/meanings of the domain are displayed as root nodes of a tree and their component primitives displayed as child nodes upon the root node of the tree being selected for expansion. Where applicable, child nodes can also be selected for further expansion to show their constituent primitive buildup as well.

As part of the inventive method, the procedures, definitions, rules, and properties of any domain are explicated into their component primitives. As such, this interface could serve to display a hierarchical decomposition of any procedure, property, rule, or definition into its component primitives, whereby each node of the hierarchy represents said primitive. All of the hierarchies within a domain are interconnected so that any particular statement might pull up multiple nodes from multiple trees.

A video/animation pane can also be incorporated into the interface to simultaneously display video and audio information that directly relates to the scrolling text. The speech present in the video and audio content can be an exact match to the displayed statements or the statements can correspond to the designer's choice of important parts of the video and audio content.

We present a methodology, to be realized by a computer program, for the intelligent presentation and delineation of algebra problems. Our methodology integrates distinct yet concurrent trains of thought in the cognitive pathway essential for the successful analysis and solving of any algebraic task via an interactive, computer-based system.

Just as a successful human problem-solver integrates the linguistic, the symbolic, the simulated and the inferential components of any algebraic task in a seamless and ordered fashion in the course of solving an algebraic question, our methodology will implant those very strains of reasoning into an intelligent engine. The computerized engine, will, in lockstep, reveal the linguistic, the symbolic, the simulated and the inferred dimensions of the algebraic task in parallel via a graphical user interface (GUI).

The engine will contain the following linked building blocks of computer code that will function synchronously in real time:

A) An algebraic parser.
B) A linguistic-mathematic parser.
C) A database of fragments of known algebra problems.
D) A database of simulations.
E) A database of linguistic fragments describing algebraic rules.

Input will be taken as an algebraic string (either an equation or an expression) or as an English-language word problem. The user will be prompted to rephrase the input as necessary so that the engine can prepare it for analysis. If a pure string is entered, the algebraic parser (A) will translate it into classes, sub-classes, and objects, solve it to completion in the background storing all granular steps (ie simplest decomposable algebraic junctures) in the process, and place it in the appropriate mathematical category (ie, quadratic equation with complex roots). If a word problem is entered, the linguistic-mathematic parser (B) will be called. It will perform "homology" matching against a massive database of word problem fragments (C) collected from algebra texts, in order to determine the class of problem. Having narrowed the search somewhat, it will then perform a heuristic analysis of linguistic relations (ie Jane is two years older than Mary, but Mary is half Donna's age) to pull out relevant equations. Finally, knowing the mathematical paradigm involved, it will transform the problem into variables, and generate all necessary equations, granularization steps, and solutions behind the scenes. This completes the first phase of the engine cycle: internalization of the problem, granularization, and explicit solution.

The engine next appeals to the simulation database (D) to extract a real-life analogy to the mathematical framework with which it has been presented that best elucidates the relations amongst variables and mathematical structures at play. For instance, a quadratic equation may require a simulation involving parabolic trajectories; an equation describing angular momentum may demand a simulation of a spinning top. The simulation database will be structured by equation or expression class, so that screening it for a relevant simulation will be straightforward. Once chosen, all relevant variables, names, and settings of the user's problems will be mapped to dummy slots in the simulation "frame".

Next, the stored granular steps containing the pathway from original problem to ultimate solution will be screened against a massive database of linguistic fragments describing algebraic rules and junctures (E) in order to build a clear, English-language solution to the problem. For instance, if a particular step of the problem requires transforming (x)(y+z) into (x)(y)+(x)(z), the database will be screened for this algebraic phrase, and will return something like (after replacing "dummy" variables, etc, for the user's own): "In this step, the distributive property must be used. You have a situation where the variables y and z are being added together FIRST, because they are within parentheses, and that quantity, (y+z) is then being multiplied by the variable x. In order to handle this, the distributive property allows us to first multiply x and y, then multiply x and z, and finally add together the result of those two multiplications. Thus the result of this sub-step yields (x)(y)+(x)(z)."

Having completed these preparatory tasks, the English-language "script" elucidating all granular steps and the simulation will be presented to the user in lockstep in an interactive multimedia format (in which they can start, stop, rewind, etc). In this manner, the trains of thought comprising the symbolic, the linguistic, and the simulated are integrated into a single framework. As the equation is solved piece by piece, the linguistic "script" describes in plain English the nature of the algebraic symbols and the rules that govern their manipulation while simultaneously the simulation visualizes the actions of these symbols in a tangible, real-world construct. The aim, naturally, is that the fluidity of the presentation will by necessity peel away the obstacles to mere "digestion" of the problem, so that the user can begin to make connections amongst the pieces of the puzzle and strengthen their meta-cognitive or inferential sense.

While illustrative embodiments of the invention have been described, it is noted that various modifications will be apparent to those of ordinary skill in the art in view of the above description and drawings. Such modifications are within the scope of the invention which is limited and defined only by the following claims.

What is claimed is:

1. A method, comprising:
   (a) creating a first database of meaning items, each of said meaning items being associated with a particular meaning, said first database being created by:
      (i) identifying a plurality of primitive words in a first group, said primitive words in said first group having a singular meaning;
      (ii) storing said plurality of primitive words in said first group having a singular meaning at a first set of storage locations in a computing device;
      (iii) identifying a plurality of primitive words in a second group, said plurality of primitive words in said second group having an associated meaning or meanings which may be defined by said primitive words in said first group and/or other primitive words in said second group;
      (iv) storing said plurality of primitive words in said second group at a second set of storage locations in a computing device;
      (v) for each of said primitive words in said second group, storing its respective associated meanings as definitional linking information, linking a respective primitive word in said second group to respective defining primitive words in said first group and/or other primitive words in said second group, whereby upon the identification of a word, a definition comprising linked primitive words may be retrieved;
      (vi) for each of a plurality of definable words, wherein said definable words are words in said first and second groups,
      (A) selecting words from said first and second groups as relative words having the same meaning as a respective definable word, and/or
      (B) associating words in said first and second groups into respective relative phrases having the same meaning as a respective definable word, each of said definable words, together with its respective relative words and relative phrases forming a relative set; and
      (vii) for each of said definable words, storing relative set linking information linking each of said definable words to its respective relative words and relative phrases, whereby upon the identification of a word, the other members of a relative set may be retrieved;
   (b) receiving a query;
   (c) comparing the words in the query to said meaning items to determine those words which are not included within said first database of meaning items, said words of said query which are not included within said first database of meaning items forming a keyword set comprising jargon-type words, and the words in said query found in said first database of meaning items forming a meaning search set comprising non-jargon meaning words;
   (d) inputting said keyword set into a search engine;
   (e) receiving a plurality of documents from said search engine;
   (f) determining whether said meaning items in said meaning search set are in each of said documents;
   (g) tallying, in a meaning database, occurrences of said meaning items in said documents;
   (h) ranking the documents based upon said occurrences tallied in said meaning database to select a plurality of top-ranked documents; and
   (i) identifying said top-ranked documents.

2. A method as in claim 1, wherein said determining whether said meaning items in said meaning search set are in each of said documents is done by searching for occurrences of said relative sets of words and/or statements with equivalent meaning.

3. A method as in claim 1, wherein said keyword searching is done by an enterprise search engine or a search engine accessing a public network such as the Internet.

4. The method of claim 1, wherein the database is not dictionary derived, encyclopedia derived, or derived from information in a database derived using another flexibly-ruled or unstructured method.

5. A method as in claim 1, wherein the database includes statements based on the encoding and etiological prioritization of procedures, properties, rules, and definitions from English and/or specialized domains.

6. A method as in claim 1, wherein the smallest number of primitives are combined with one another to create a singular context, property, procedure, or definition within a domain to create higher level terms in a prioritized data set.

7. A method as in claim 1, wherein a portion of said primitive words in said first group are derived through an etiological logical progression of primitives, said primitives being progressively built using a model of causation, whereby basic singular forms, starting from a sensing of patterns of things, are built, based on describing the relationships between multiple patterns of said things, said relationships being words in said first group; using the relationships amongst these sensed things to both build and assign meaning to words in said first and second groups to form an ordered hierarchy of interrelationships, said words in said first and second groups being combined with things and other things or words in said first and second groups to build the meanings of new words in said first and second groups, the continued development of relationships between primitives and things assigning meaning to and/or building etiologically prioritized meanings of human based capabilities and experiences, such as recognition, generation, action, want, belief, feelings, new meanings being built via the combination of singular primitives representing human capabilities, such as senses, recognitions, feelings, belief, generations, combined with words in said first and second groups not representing human capabilities, such as things, operators, prepositions, adjectives, pronouns, interjections, verbs, nouns, and probability.

8. A method, comprising:
(a) identifying a plurality of primitive words and phrases in a first group, said primitive words and phrases in said first group having a singular meaning;
(b) storing said plurality of primitive words and phrases in said first group having a singular meaning at a first set of storage locations in a computing device;
(c) identifying a plurality of primitive words and phrases in a second group, said plurality of primitive words and phrases in said second group having an associated meaning or meanings which may be defined by said primitive words in said first group and/or other primitive words and phrases in said second group;
(d) storing said plurality of primitive words in said second group at a second set of storage locations in a computing device;
(e) for each of said primitive words in said second group, storing its respective associated meanings as definitional linking information, linking a respective primitive word in said second group to respective defining primitive words in said first group and/or other primitive words in said second group, whereby upon the identification of any word and phrase, a definition comprising linked primitive words may be retrieved;
(f) for each of a plurality of definable words, wherein said definable words are words and phrases in said first and second groups,
  (i) selecting words and phrases from said first and second groups as relative words having the same meaning as a respective definable word, and/or
  (ii) associating words and phrases in said first and second groups into respective relative phrases having the same meaning as a respective definable word, each of said definable words, together with its respective relative words and relative phrases forming a relative set;
(g) for each of said definable words, storing relative set linking information linking each of said definable words and phrases to their respective relative words and relative phrases, whereby upon the identification of any word, the other members of a relative set may be retrieved;
(h) receiving a query;
(i) comparing the words in the query to said words in said first and second groups to determine those words which are not included within said first and second groups said not included words forming a keyword search set, the words in said query found in said first and second groups forming a meaning search set;
(j) inputting said words in said meaning search set into a search engine, said search engine accessing a database of documents;
(k) determining whether said words in said meaning search set are in each of said documents;
(l) tallying in a search results database occurrences in said documents of said words in said meaning search set;
(m) ranking the documents based upon said occurrences tallied in said search results database to select a plurality of top-ranked documents;
(n) inputting said keyword set into said search engine;
(o) determining whether the words in said keyword set are in each of said documents;
(p) tallying in said search results database occurrences in said documents of said words in said keyword set, wherein said ranking of said documents is also based upon said occurrences of said words in said keyword set tallied in said search results database; and
(q) identifying said top-ranked documents.

9. A method as in claim 8, wherein said second group is divided into a combinatorial group and a terminal group, said combinatorial group comprising words having singular and multiple meaning components, and said terminal group comprising words having multiple meaning components.

10. A method as in claim 8, wherein said primitive words in said first group are generated by a method comprising postulating a sensing of a pattern of things; recognizing said sensed thing; requiring a word to represent a thing, requiring a word to represent a word, and using a combination of things and words to make more definitionally complex words.

11. A method as in claim 8, wherein a portion of said primitive words in said first group are derived through an etiological logical progression of primitive words, said primitives being progressively built using a model of causation, whereby basic singular forms, starting from a sensing of patterns of things, are built, based on describing the relationships between multiple patterns of said things, said relationships being words in said first group; using the relationships amongst these sensed things to both build and assign meaning to words in said first and second groups to form an ordered hierarchy of interrelationships, said words in said first and second groups being combined with things and other things or words in said first and second groups to build the meanings of new words in said first and second groups, the continued development of relationships between primitives and things assigning meaning to and/or building etiologically prioritized meanings of human based capabilities and experiences, such as recognition, generation, action, want, belief, feelings, new meanings being built via the combination of singular primitives representing human capabilities, such as senses, recognitions, feelings, belief, generations, combined with words in said first and second groups not representing human capabilities, such as things, operators, prepositions, adjectives, pronouns, interjections, verbs, nouns, and probability.

12. A method as in claim 8 wherein said first group has forty or more words selected from the group consisting of the words mass, thought, emotion, feeling, sense, recognition, generation, action, truth, place, positive, negative, neutral, not, is, personalization, stop, continue, start, question, answer, amount, name, again, gain, loss, displace, move, change, time, like, dislike, and, attention, not, direction, a, the, for, because, action/do, real, position, proximity, from, to, forward, backward, side, energy, in, out, on, below, over, under, sad, happy, anger, nervous, fear, good, bad, away, smile, frown, land, know, same, different, melancholy, notice, say, read, write, and curious, or words which are equivalent thereto.

13. A method as in claim 8, wherein said identifying the plurality of primitive words having a singular meaning in the first group comprises asking about unknown or changing items.

14. A method as in claim 8, wherein said primitive words in said first and second groups form a prioritized data set.

15. A method as in claim 8, wherein a series of questions and answers is used to ask about unknown or changing items to query about unknown actions and events by adjoining to augment search queries and resulting results.

16. A method as in claim 8, wherein the smallest number of primitives are combined with one another to create a singular context, property, procedure, or definition within a domain to create higher level terms in a prioritized data set.

17. A method as in claim 8, wherein the smallest number of primitives are combined with one another to create a singular context, property, procedure, or definition within a domain to create higher level terms in a prioritized data set.

18. A method comprising:
   (a) identifying a plurality of primitive words and phrases in a first group, said primitive words and phrases in said first group having a singular meaning;
   (b) storing said plurality of primitive words and phrases in said first group having a singular meaning at a first set of storage locations in a computing device;
   (c) identifying a plurality of primitive words and phrases in a second group, said plurality of primitive words and phrases in said second group having an associated meaning or meanings which may be defined by said primitive words in said first group and/or other primitive words and phrases in said second group;
   (d) storing said plurality of primitive words in said second group at a second set of storage locations in a computing device;
   (e) for each of said primitive words in said second group, storing its respective associated meanings as definitional linking information, linking a respective primitive word in said second group to respective defining primitive words in said first group and/or other primitive words in said second group, whereby upon the identification of any word and phrase, a definition comprising linked primitive words may be retrieved;
   (f) for each of a plurality of definable words, wherein said definable words are words and phrases in said first and second groups,
      (i) selecting words and phrases from said first and second groups as relative words having the same meaning as a respective definable word, and/or
      (ii) associating words and phrases in said first and second groups into respective relative phrases having the same meaning as a respective definable word, each of said definable words, together with its respective relative words and relative phrases forming a relative set;
   (g) for each of said definable words, storing relative set linking information linking each of said definable words and phrases to their respective relative words and relative phrases, whereby upon the identification of any word, the other members of a relative set may be retrieved;
   (h) receiving a query;
   (i) comparing the words in the query to said words and phrases in said first and second groups to determine those words which are not included within said first and second groups said not included words forming a keyword search set, the words in said query found in said first and second groups forming a meaning search set;
   (j) inputting into a search engine a group of words and phrases, comprising:
      i. said words and phrases in said meaning search set,
      ii. the words in the definitions of said words and phrases in said meaning search set, and
      iii. the relative sets of said words and phrases in said meaning search set, and the relative sets of said words and phrases in the definitions of said words in said meaning search set;
   (k) determining whether words and phrases from said group of words and phrases are in each of a plurality of documents being accessed by said search engine;
   (l) tallying in a search results database occurrences in said documents of said words and phrases from said group of words and phrases;
   (m) ranking the documents based upon said occurrences tallied in said search results database to select a plurality of top-ranked documents;
   (n) identifying said top-ranked documents;
   (o) inputting said keyword set into said search engine;
   (p) determining whether the words in said keyword set are in each of said documents; and
   (q) tallying in said search results database occurrences in said documents of said words in said keyword set, wherein said ranking of said documents is also based upon said occurrences of said words in said keyword set tallied in said search results database.

19. A method as in claim 18, wherein said determining is done on a paragraph by paragraph basis, and said ranking is done by ranking individual paragraphs, and then assigning document ranks on the basis of their constituent paragraph rankings.

20. A method as in claim 19, wherein said top-ranked documents are identified by outputting top ranked paragraphs and hyperlinking to their respective documents.

21. A method as in claim 18, wherein a portion of said primitive words in said first group are derived through an etiological logical progression of primitives, said primitives being progressively built using a model of causation, whereby basic singular forms, starting from a sensing of patterns of things, are built, based on describing the relationships between multiple patterns of said things, said relationships being words in said first group; using the relationships amongst these sensed things to both build and assign meaning to words in said first and second groups to form an ordered hierarchy of interrelationships, said words in said first and second groups being combined with things and other things or words in said first and second groups to build the meanings of new words in said first and second groups, the continued development of relationships between primitives and things assigning meaning to and/or building etiologically prioritized meanings of human based capabilities and experiences, such as recognition, generation, action, want, belief, feelings, new meanings being built via the combination of singular primitives representing human capabilities, such as senses, recognitions, feelings, belief, generations, combined with words in said first and second groups not representing human capabilities, such as things, operators, prepositions, adjectives, pronouns, interjections, verbs, nouns, and probability.

* * * * *